(12) United States Patent
Katayose et al.

(10) Patent No.: US 8,432,464 B2
(45) Date of Patent: Apr. 30, 2013

(54) ZOOM LENS SYSTEM FOR IMAGE PICKUP APPARATUS

(75) Inventors: Masato Katayose, Hachioji (JP); Kenji Ono, Fussa (JP); Hideyuki Nagaoka, Hino (JP); Kazuhito Hayakawa, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 140 days.

(21) Appl. No.: 13/136,637

(22) Filed: Aug. 4, 2011

(65) Prior Publication Data
US 2012/0038795 A1 Feb. 16, 2012

(30) Foreign Application Priority Data

Aug. 12, 2010 (JP) ................................. 2010-181008
Aug. 23, 2010 (JP) ................................. 2010-186222

(51) Int. Cl.
*H04N 5/262* (2006.01)
(52) U.S. Cl.
USPC .................. 348/240.3; 348/335; 359/676
(58) Field of Classification Search ............... 348/240.3, 348/240.99, 335–357
See application file for complete search history.

(56) References Cited

U.S. PATENT DOCUMENTS

| 7,286,299 B2* | 10/2007 | Matsui | 359/687 |
| 7,315,423 B2* | 1/2008 | Sato | 359/687 |
| 2005/0002115 A1* | 1/2005 | Mihara | 359/686 |
| 2006/0018032 A1* | 1/2006 | Mihara | 359/676 |
| 2008/0278824 A1* | 11/2008 | Shirota | 359/684 |
| 2009/0040623 A1* | 2/2009 | Morooka et al. | 359/687 |
| 2009/0080088 A1* | 3/2009 | Ohashi | 359/687 |
| 2009/0147375 A1* | 6/2009 | Sudoh et al. | 359/684 |
| 2010/0157104 A1* | 6/2010 | Nagaoka et al. | 348/240.3 |
| 2010/0271710 A1* | 10/2010 | Ohashi | 359/687 |
| 2012/0038795 A1* | 2/2012 | Katayose et al. | 348/240.1 |
| 2012/0075494 A1* | 3/2012 | Katayose et al. | 348/222.1 |

FOREIGN PATENT DOCUMENTS

JP 2009-236973 10/2009

* cited by examiner

*Primary Examiner* — Nelson D. Hernández Hernández
(74) *Attorney, Agent, or Firm* — Kenyon & Kenyon LLP

(57) ABSTRACT

A zoom lens includes, in order from the object side to the image side, a first lens unit having a positive refracting power and including a reflecting member having a reflecting surface, a second lens unit having a negative refracting power, a rear lens unit group having a positive refracting power as a whole and including at least three lens units, which includes in order from the object side, a third lens unit, a fourth lens unit, and a fifth lens unit. An aperture stop is provided between the second lens unit and the fourth lens unit. During zooming from the wide angle end to the telephoto end, the first lens unit is kept stationary, the second lens unit is located closer to the image side at the telephoto end than at the wide angle end, and the distances between the lens units change. The first lens unit includes, in order from the object side, a negative lens component, the reflecting member, and a rear sub-lens unit including a first positive lens element and a second positive lens element. The second lens unit includes a plurality of lens elements including a negative lens element. The zoom lens satisfies certain conditions.

38 Claims, 19 Drawing Sheets

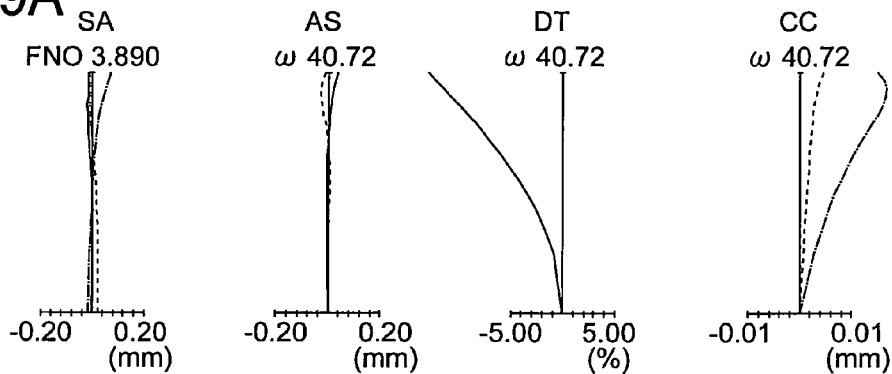
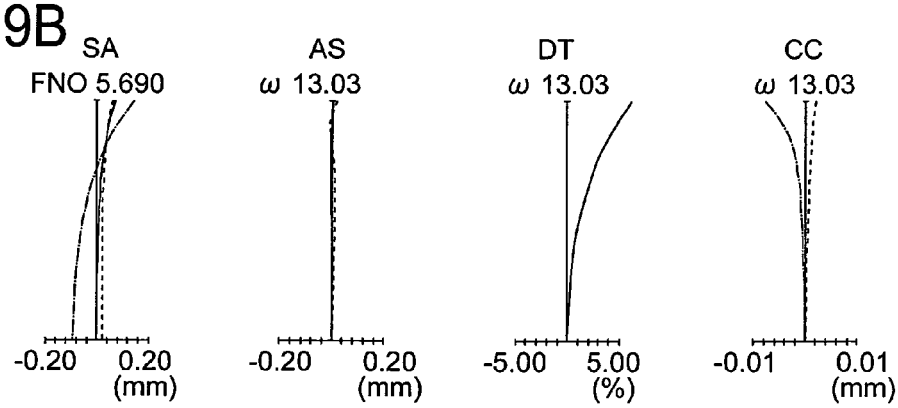
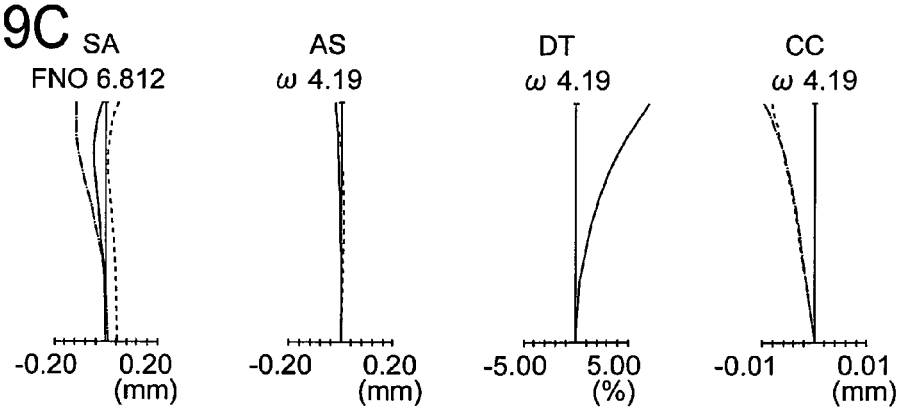

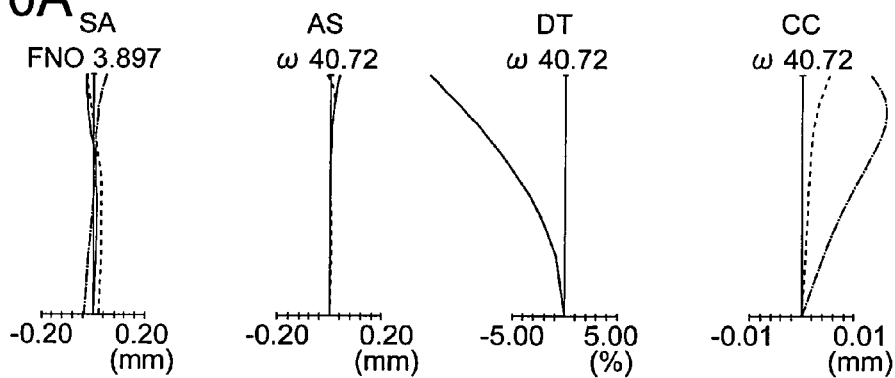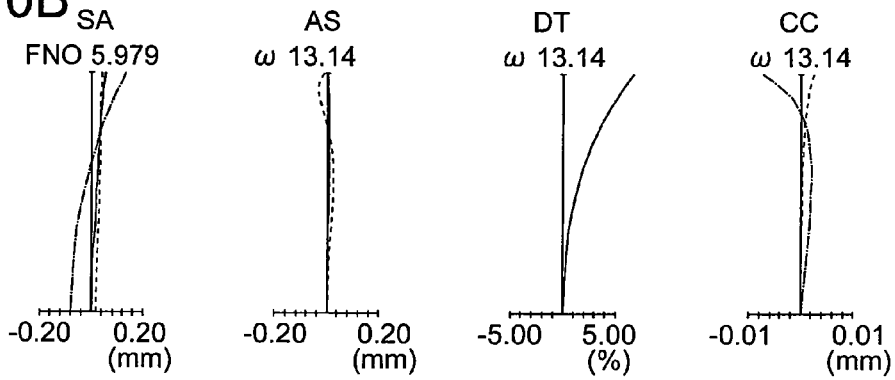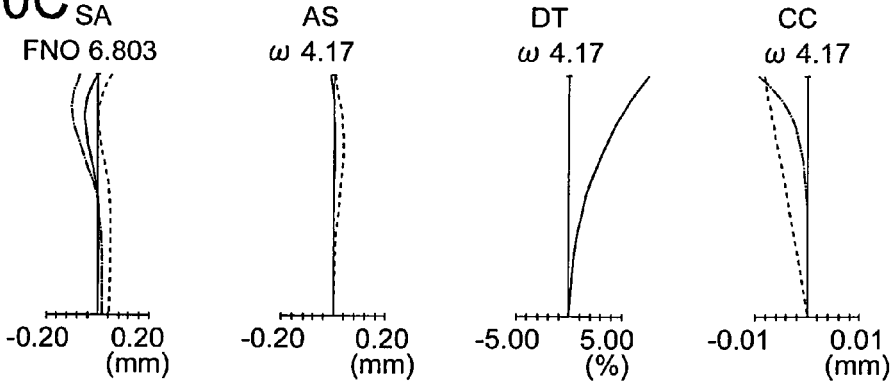

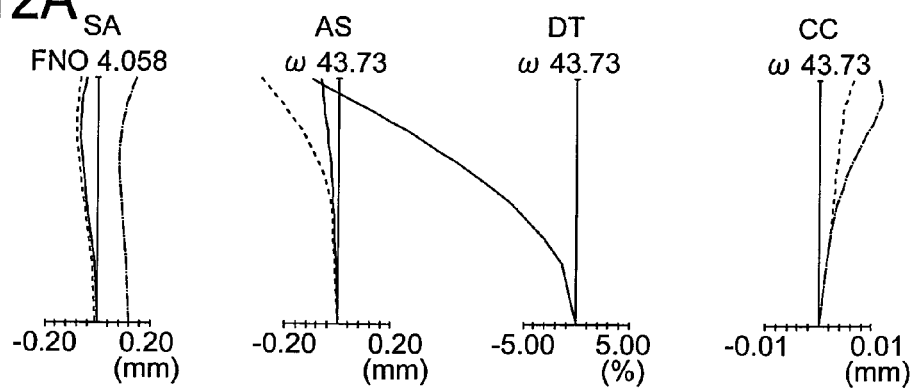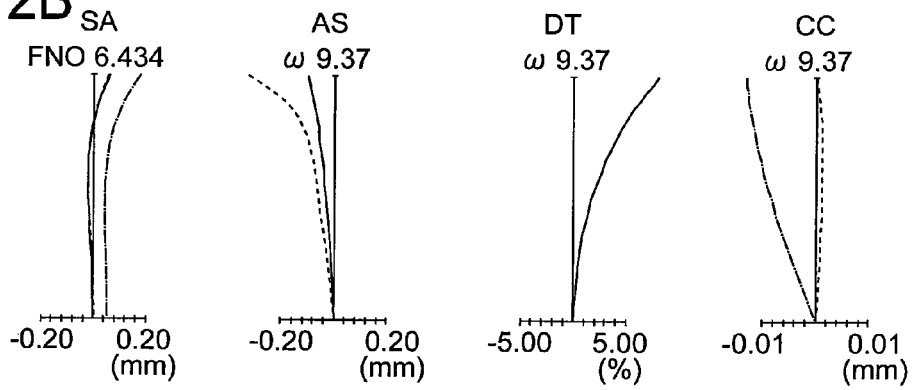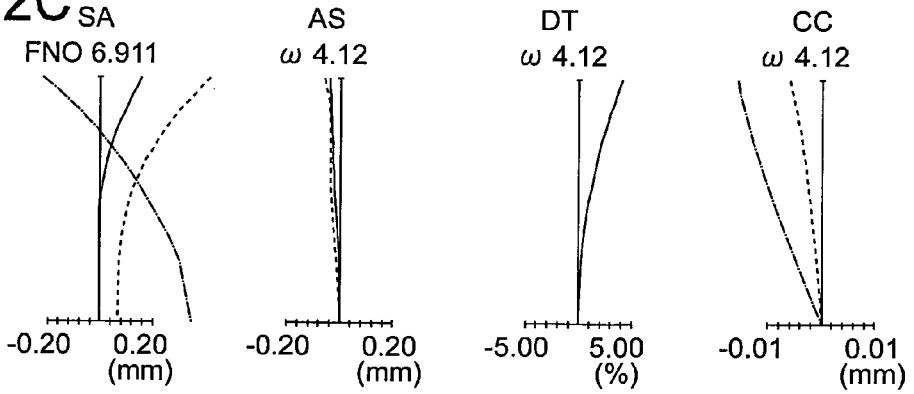

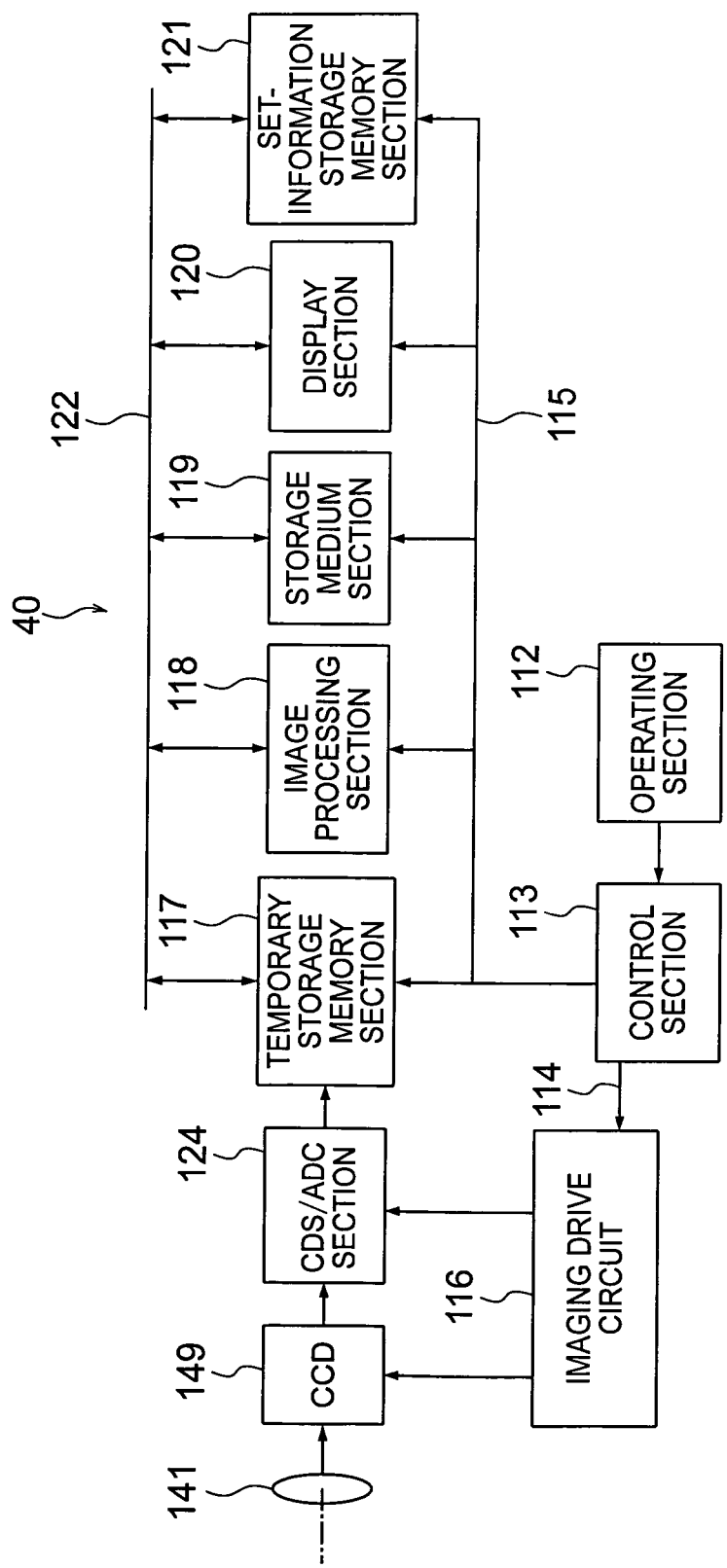

ZOOM LENS SYSTEM FOR IMAGE PICKUP APPARATUS

CROSS-REFERENCE TO RELATED APPLICATION

The present application is based upon and claims the benefit of priority from the prior Japanese Patent Application No. 2010-181008 filed on Aug. 12, 2010 and the prior Japanese Patent Application No. 2010-186222 filed on Aug. 23, 2010; the entire contents of which are incorporated herein by reference.

BACKGROUND OF THE INVENTION

1. Field of the Invention

The present invention relates an image pickup apparatus equipped with a zoom lens having a reflecting member that deflects the optical path to make the thickness of the apparatus smaller.

2. Description of the Related Art

Zoom lenses in which a reflecting member that deflects the optical path is provided in the optical path of the zoom lens to reduce the thickness of image pickup apparatuses (in particular digital cameras) have been known.

In particular, there is a known image pickup apparatus equipped with a zoom lens in which a reflecting member is provided in the first lens unit closest to the object side among the lens units in the zoom lens and the zoom lens is fixed relative to the body of the apparatus to eliminate extension of the zoom lens from the apparatus body. Such elimination of the extension of the zoom lens from the apparatus body enables improvement in the resistance of the image pickup apparatus against dust, water and impacts.

Recently, needs for zoom lenses having a high zoom ratio and a wide angle of view have been growing in addition to needs for slimming of image pickup apparatuses.

Japanese Patent Application Laid-Open No. 2009-236973 discloses a zoom lens that responds to such needs.

The zoom lens disclosed in Japanese Patent Application Laid-Open No. 2009-236973 includes, in order from the object side, a first lens unit having a positive refracting power, a second lens unit having a negative refracting power, an aperture stop, a third lens unit having a positive refracting power, a fourth lens unit having a negative refracting power, and a fifth lens unit having a positive refracting power, wherein a reflecting member (specifically, a rectangular prism) is provided in the first lens unit, and the second lens unit, the aperture stop, the third lens unit, and the fifth lens unit are moved independently from each other during zooming from the wide angle end to the telephoto end. This zoom lens has a high zoom of approximately 10. In the zoom lens disclosed in Japanese Patent Application Laid-Open No. 2009-236973, the second lens unit is moved by a large amount to provide an adequate magnification change, achieving a high zoom ratio. In order for the first lens unit to have an appropriately high positive refracting power, it is configured to include, in order from the object side, a negative lens, the reflecting member (rectangular prism) and two positive lenses disposed on its image side. Thus, the positive refracting powers are distributed to the two lenses to reduce aberrations.

SUMMARY OF THE INVENTION

An image pickup apparatus according to a first aspect of the present invention comprises:
a zoom lens; and
an image pickup element having an image pickup surface for converting an image formed by the zoom lens into an electrical signal, wherein
the zoom lens comprises, in order from the object side to the image side, a first lens unit having a positive refracting power including a reflecting member having a reflecting surface that deflects the optical path, a second lens unit having a negative refracting power, and a rear lens unit group having a positive refracting power as a whole and comprising, in order from the object side, a third lens unit, a fourth lens unit, and a fifth lens unit,
the zoom lens comprises an aperture stop disposed between the second lens unit and the fourth lens unit,
during zooming from the wide angle end to the telephoto end, the first lens unit is kept stationary, the second lens unit moves in such a way that it is located closer to the image side at the telephoto end than at the wide angle end, and the distances between the lens units change,
the first lens unit comprises, in order from the object side to the image side, a negative lens component, the reflecting member, and a rear sub-lens unit comprising a first positive lens element and a second positive lens element, and
the following conditional expressions (1), (2), and (3) are satisfied:

$$7 < f_T/f_W < 30 \tag{1},$$

$$0.5 < f_W/IH < 1.38 \tag{2},$$

and $$16.5 < |\nu_{dp1} - \nu_{dp2}| < 80 \tag{3},$$

where $f_T$ is the focal length of the entire zoom lens system at the telephoto end, $f_W$ is the focal length of the entire zoom lens system at the wide angle end, IH is the highest image height in an effective image pickup area on the image pickup surface, $\nu_{dp1}$ is the Abbe constant of the first positive lens element in the first lens unit with respect to the d-line, $\nu_{dp2}$ is the Abbe constant of the second positive lens element in the first lens unit with respect to the d-line, the term "lens component" refers to a lens member composed of a single lens element or a cemented lens component delimited by effective lens surfaces that are in contact with air, and the Abbe constant is defined as $(n_{d1}-1)/(n_{F1}-n_{C1})$ with $n_{d1}$, $n_{C1}$, and $n_{F1}$ being the refractive indices of the first or second positive lens element with respect to the d-line, the C-line, and the F-line respectively.

An image pickup apparatus according to a second aspect of the present invention comprises:
a zoom lens; and
an image pickup element having an image pickup surface for converting an image formed by the zoom lens into an electrical signal, wherein
the zoom lens comprises, in order from the object side to the image side, a first lens unit having a positive refracting power comprising a reflecting member having a reflecting surface that deflects the optical path, a second lens unit having a negative refracting power, and a rear lens unit group having a positive refracting power as a whole and comprising, in order from the object side, a third lens unit, a fourth lens unit, and a fifth lens unit, the zoom lens comprises an aperture stop disposed between the second lens unit and the fourth lens unit, during zooming from the wide angle end to the telephoto end, the first lens unit is kept stationary, the second lens unit moves in such a way that it is located closer to the image side at the telephoto end than at the wide angle end, and the distances between the lens units change, the first lens unit comprises, in order from the object side to the image side, a negative lens component, the reflecting member, and a rear sub-lens unit comprising a first positive lens element and a second positive lens element, the rear lens unit group comprises at least three lens units each having a positive refracting power, the following conditional expressions (3) and (4) are satisfied:

$$16.5 < |v_{dp1} - v_{dp2}| < 80 \quad (3),$$

and $$2.35 < |\Delta_{2G}/f_W| < 15 \quad (4),$$

where $v_{dp1}$ is the Abbe constant of the first positive lens element in the first lens unit with respect to the d-line, $v_{dp2}$ is the Abbe constant of the second positive lens element in the first lens unit with respect to the d-line, $\Delta_{2G}$ is the displacement of the position of the second lens unit at the telephoto end from the position of the second lens unit at the wide angle end with a displacement toward the image side being represented by a positive value, and $f_W$ is the focal length of the zoom lens at the wide angle end, the term "lens component" referring to a lens member is a single lens element or a cemented lens component delimited by effective lens surfaces that are in contact with air, the Abbe constant being defined as $(n_{d1}-1)/(n_{F1}-n_{C1})$ with $n_{d1}$, $n_{C1}$, and $n_{F1}$ being the refractive indices of the first or second positive lens element with respect to the d-line, the C-line, and the F-line respectively.

An image pickup apparatus according to a third aspect of the present invention comprises:

a zoom lens; and an image pickup element having an image pickup surface for converting an image formed by the zoom lens into an electrical signal, wherein the zoom lens comprises, in order from the object side to the image side, a first lens unit having a positive refracting power comprising a reflecting member having a reflecting surface that deflects the optical path, a second lens unit having a negative refracting power, and a rear lens unit group having a positive refracting power as a whole and comprising, in order from the object side, a third lens unit, a fourth lens unit, and a fifth lens unit, the zoom lens comprises an aperture stop disposed between the second lens unit and the fourth lens unit, during zooming from the wide angle end to the telephoto end, the first lens unit is kept stationary, the second lens unit moves in such a way that it is located closer to the image side at the telephoto end than at the wide angle end, and the distances between the lens units change, the first lens unit comprises, in order from the object side to the image side, a negative lens component, the reflecting member, and a rear sub-lens unit comprising a first positive lens element and a second positive lens element, the second lens unit comprises a plurality of lens elements including a negative lens element, and the following conditional expressions (1), (2), and (AA) are satisfied:

$$7 < f_T/f_W < 30 \quad (1),$$

$$0.5 < f_W/IH < 1.38 \quad (2),$$

and $$-0.2 < f_{2G}/f_T < -0.05 \quad (AA),$$

where $f_T$ is the focal length of the entire zoom lens system at the telephoto end, $f_W$ is the focal length of the entire zoom lens system at the wide angle end, IH is the highest image height in an effective image pickup area on the image pickup surface, $f_{2G}$ is the focal length of the second lens unit, and the term "lens component" refers to a lens member composed of a single lens element or a cemented lens component delimited by effective lens surfaces that are in contact with air.

An image pickup apparatus according to a fourth aspect of the present invention comprises:

a zoom lens; and an image pickup element having an image pickup surface for converting an image formed by the zoom lens into an electrical signal, wherein the zoom lens comprises, in order from the object side to the image side, a first lens unit having a positive refracting power comprising a reflecting member having a reflecting surface that deflects the optical path, a second lens unit having a negative refracting power, and a rear lens unit group having a positive refracting power as a whole and comprising, in order from the object side, a third lens unit, a fourth lens unit, and a fifth lens unit, the zoom lens comprises an aperture stop disposed between the second lens unit and the fourth lens unit, during zooming from the wide angle end to the telephoto end, the first lens unit is kept stationary, the second lens unit moves in such a way that it is located closer to the image side at the telephoto end than at the wide angle end, and the distances between the lens units change, the first lens unit comprises, in order from the object side to the image side, a negative lens component, the reflecting member, and a rear sub-lens unit comprising a first positive lens element and a second positive lens element, the second lens unit comprises a plurality of lens elements including a negative lens element, the rear lens unit group comprises at least three lens units each having a positive refracting power, and the following conditional expressions (3), (4A), and (AA) are satisfied:

$$-0.2 < f_{2G}/f_T < -0.05 \quad (AA),$$

$$1.8 < \Delta_{2G}/f_W < 15 \quad (4A),$$

and $$16.5 < |v_{dp1} - v_{dp2}| < 80 \quad (3),$$

where $f_T$ is the focal length of the entire zoom lens system at the telephoto end, $f_W$ is the focal length of the entire zoom lens system at the wide angle end, $f_{2G}$ is the focal length of the second lens unit, $\Delta_{2G}$ is the displacement of the position of the second lens unit at the telephoto end from the position of the second lens unit at the wide angle end with a displacement toward the image side being represented by a positive value, $v_{dp1}$ is the Abbe constant of the first positive lens element in the first lens unit with respect to the d-line, $v_{dp2}$ is the Abbe constant of the second positive lens element in the first lens unit with respect to the d-line, the term "lens component" refers to a lens member composed of a single lens element or a cemented lens component delimited by effective lens surfaces that are in contact with air, and the Abbe constant is defined as $(n_{d1}-1)/(n_{F1}-n_{C1})$ with $n_{d1}$, $n_{C1}$, and $n_{F1}$ being the refractive indices of the first or second positive lens element with respect to the d-line, the C-line, and the F-line respectively.

BRIEF DESCRIPTION OF THE DRAWINGS

FIGS. 9A, 9B, and 9C show aberrations of the zoom lens according to the second embodiment in the state in which the zoom lens is focused on an object point at infinity;

FIGS. 10A, 10B, and 10C show aberrations of the zoom lens according to the third embodiment in the state in which the zoom lens is focused on an object point at infinity;

FIGS. 12A, 12B, and 12C show aberrations of the zoom lens according to the fifth embodiment in the state in which the zoom lens is focused on an object point at infinity;

FIG. 19 is a block diagram showing the basic internal circuit configuration of the digital camera.

DETAILED DESCRIPTION OF THE INVENTION

Figure 1A:
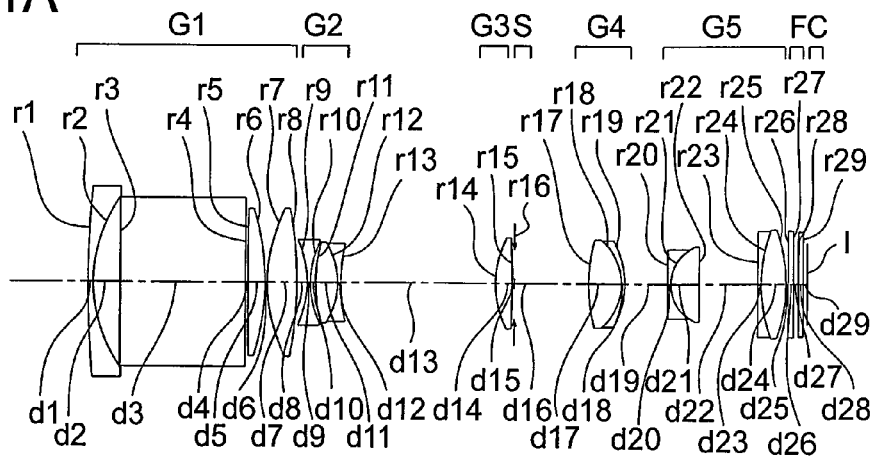
FIGS. 1A, 1B, and 1C are cross sectional views of a zoom lens according to a first embodiment of the present invention in the state in which the zoom lens is focused on an object point at infinity, respectively at the wide angle end, in an intermediate focal length state, and at the telephoto end.

The image pickup apparatus according to the first mode of the present invention has a zoom lens and an image pickup element having an image pickup surface for converting an image formed by the zoom lens into an electrical signal, wherein the zoom lens comprises, in order from the object side to the image side, a first lens unit having a positive refracting power including a reflecting member having a reflecting surface that deflects the optical path, a second lens unit having a negative refracting power, and a rear lens unit group having a positive refracting power as a whole and comprising at least three lens units including, in order from the object side, a third lens unit, a fourth lens unit, and a fifth lens unit, the zoom lens has an aperture stop disposed between the second lens unit and the fourth lens unit, the first lens unit is kept stationary during zooming from the wide angle end to the telephoto end, the second lens unit moves during zooming in such a way that it is located closer to the image side at the telephoto end than at the wide angle end, the distances between the lens units change during zooming, the first lens unit includes, in order from the object side to the image side, a negative lens component, the reflecting member and a rear sub-lens unit including a first positive lens element and a second positive lens element and the following conditional expressions (1), (2), and (3) are satisfied:

$$7 < f_T/f_W < 30 \quad (1),$$

$$0.5 < f_W/IH < 1.38 \quad (2),$$

and $$16.5 < |v_{dp1} - v_{dp2}| < 80 \quad (3),$$

where $f_T$ is the focal length of the entire zoom lens system at the telephoto end, $f_W$ is the focal length of the entire zoom lens system at the wide angle end, IH is the highest image height in an effective image pickup area on the image pickup surface, $v_{dp1}$ is the Abbe constant of the first positive lens element in the first lens unit with respect to the d-line, $v_{dp2}$ is the Abbe constant of the second positive lens element in the first lens unit with respect to the d-line, the term "lens component" refers to a lens member composed of a single lens element or a cemented lens component delimited by effective lens surfaces that are in contact with air, and the Abbe constant is defined as $(n_{d1}-1)/(n_{F1}-n_{C1})$ with $n_{d1}$, $n_{C1}$, and $n_{F1}$ being the refractive indices of the first or second positive lens element with respect to the d-line, the C-line, and the F-line respectively.

In the image pickup apparatus according to the first mode, since the optical path is deflected by the reflecting member in the first lens unit, the thickness of the image pickup apparatus can be made smaller advantageously.

Therefore, the zoom lens can easily be designed to have a constant overall length, and the second lens unit can appropriately provide the magnification changing effect. In addition, the use of a plurality of lens units in the zoom lens is advantageous for achieving an appropriate zoom ratio and for reducing the variation of aberrations.

Moreover, two positive lens elements are used in the first lens unit in order to achieve an appropriate zoom ratio. This is advantageous for correction of monochromatic aberrations.

Conditional expression (1) specifies a preferred range of the zoom ratio.

As the lower limit of conditional expression (1) is reached, the user can enjoy variations of the angle of view and can capture objects in the image frame in various shooting situations.

As the upper limit of conditional expression (1) is not exceeded, camera shake that can be caused with a large F-number at the telephoto end of the zoom range and noises in the image that can be generated with a gain increase for raising the effective sensitivity can readily be reduced.

Conditional expression (2) relates to a preferred range of the angle of view at the wide angle end.

If the lower limit of conditional expression (2) is reached, distortion can easily be made small and an increase in the number of lenses in the first lens unit can be prevented.

Conditional expression (3) specifies a preferred range of the difference in the Abbe constant between the first positive lens element and the second positive lens element in the first lens unit.

If the difference in the Abbe constants is so large as to be larger than the lower limit of conditional expression (3) in optical systems having a high zoom ratio and not so large overall optical length, it will be possible to efficiently suppress chromatic aberration of magnification even with a first lens unit having a high positive refracting power.

If the upper limit of conditional expression (3) is not exceeded, the ease of manufacturing of the positive lens elements used in combination can be prevented from being deteriorated. This enhances cost-effectiveness also.

In the case where the zoom lens has a focusing function, the features described in the foregoing should be interpreted as those for the state in which the zoom lens is focused on an object at the longest distance. This also applies to the apparatuses or zoom lenses according the other modes of the invention that will be described later.

The rear lens unit group may include at least three lens units each having a positive refracting power, and the following conditional expression (4) may be satisfied instead of conditional expressions (1) and (2):

$$2.35<|\Delta_{2G}/f_W|<15 \qquad (4).$$

The image pickup apparatus according to the second mode of the present invention has a zoom lens and an image pickup element having an image pickup surface for converting an image formed by the zoom lens into an electrical signal, wherein the zoom lens comprises, in order from the object side to the image side, a first lens unit having a positive refracting power including a reflecting member having a reflecting surface that deflects the optical path, a second lens unit having a negative refracting power, and a rear lens unit group having a positive refracting power as a whole and comprising at least three lens units including, in order from the object side, a third lens unit, a fourth lens unit, and a fifth lens unit, the zoom lens has an aperture stop disposed between the second lens unit and the fourth lens unit, the first lens unit is kept stationary during zooming from the wide angle end to the telephoto end, the second lens unit moves during zooming in such a way that it is located closer to the image side at the telephoto end than at the wide angle end, the distances between the lens units change during zooming, the first lens unit includes, in order from the object side to the image side, a negative lens component, the reflecting member and a rear sub-lens unit including a first positive lens element and a second positive lens element, the rear lens unit group includes at least three lens unit each having a positive refracting power, and the following conditional expressions (3) and (4) are satisfied:

$$16.5<|\nu_{dp1}-\nu_{dp2}|<80 \qquad (3),$$

and $$2.35<|\Delta_{2G}/f_W|<15 \qquad (4),$$

where $\nu_{dp1}$ is the Abbe constant of the first positive lens element in the first lens unit with respect to the d-line, $\nu_{dp2}$ is the Abbe constant of the second positive lens element in the first lens unit with respect to the d-line, $\Delta_{2G}$ is the displacement of the position of the second lens unit at the telephoto end from the position of the second lens unit at the wide angle end with a displacement toward the image side being represented by a positive value, and $f_W$ is the focal length of the zoom lens at the wide angle end, the term "lens component" referring to a lens member is a single lens element or a cemented lens component delimited by effective lens surfaces that are in contact with air, the Abbe constant being defined as $(n_{d1}-1)/(n_{F1}-n_{C1})$ with $n_{d1}$, $n_{C1}$, and $n_{F1}$ being the refractive indices of the first or second positive lens element with respect to the d-line, the C-line, and the F-line respectively.

In order to achieve an appropriately large angle of view at the wide angle end, it is necessary for the composite system made up of the third and subsequent lens units to have an adequately high positive refracting power.

According to the second mode of the invention, the rear lens unit group includes at least three lens units each having a positive refracting power. Therefore, these lens units each having a positive refracting power can contribute to the positive refracting power. This is advantageous for achieving good performance.

Conditional expression (4) specifies a range of the amount of movement of the second lens unit that is preferred for achieving an appropriate zoom ratio and an appropriate angle of view and for size reduction.

As the amount of movement of the second lens unit is so large that the lower limit of conditional expression (4) is reached, the entire zoom lens system can constitute a retrofocus system at the wide angle end of the zoom range, enabling to achieve an adequate angle of view. In addition, the second lens unit can efficiently provide the magnification change. Therefore, the refracting power of the second lens unit can be made smaller. This facilitates reduction of aberrations in the second lens unit.

As the amount of movement of the second lens unit is so small that the upper limit of conditional expression (4) is not exceeded, the entrance pupil can easily be made closer to the first lens unit. Thus, the effective diameter of the first lens unit can be prevented from becoming large. This is advantageous for reduction in the size of the image pickup apparatus while achieving an appropriate angle of view.

The image pickup apparatus according to the second mode also has the advantages same as the first mode.

In the image pickup apparatus according to the second embodiment, it is preferred that the third lens unit have a positive refracting power, the fourth lens unit have a positive refracting power, the fifth lens unit have a positive refracting power, and the total number of lens units in the zoom lens be five.

In this type of five-unit zoom lens with a positive-negative-positive-positive-positive configuration, the second lens unit can be designed to provide the principal magnification change. To achieve an appropriately large angle of view at the wide angle end, it is necessary for the composite system made up of the third and subsequent lens units to have an adequately high positive refracting power. With the use of the three lens units each having a positive refracting power, the positive refracting powers can be distributed to these lens units. This is advantageous for achieving size reduction with a reduced number of lens units and for achieving good performance.

In the image pickup apparatus according to the first mode, it is preferred that the rear lens unit group include at least three lens units each having a positive refracting power.

Furthermore, it is preferred that the third lens unit have a positive refracting power, the fourth lens unit have a positive refracting power, the fifth lens unit have a positive refracting power, and the total number of lens units in the zoom lens be five.

In the image pickup apparatus according to the first mode, it is preferred that the following conditional expression (4) be satisfied:

$$2.35 < |\Delta_{2G}/f_W| < 15 \qquad (4),$$

where $\Delta_{2G}$ is the displacement of the position of the second lens unit at the telephoto end from the position of the second lens unit at the wide angle end with a displacement toward the image side being represented by a positive value, and $f_W$ is the focal length of the zoom lens at the wide angle end.

In the image pickup apparatus according to the present invention, it is preferred that the third lens unit have a positive refracting power, a fourth lens unit have a positive refracting power, the fifth lens unit have a negative refracting power, and a sixth lens unit having a positive refracting power be provided on the image side of the fifth lens unit.

In this zoom lens having a positive-negative-positive-positive-negative-positive configuration (in order from the object side), having a negative lens unit in the rear lens unit group facilitates reduction of the effective diameter of the third and fourth lens units and reduction of the thickness of the optical system. This is also advantageous for correction of curvature of field.

Moreover, focusing may be performed by moving the fifth lens unit. This will lead to a reduction in the size of the optical system.

In the image pickup apparatus according to the present invention, it is preferred that one of the first positive lens element and the second positive lens element satisfy the following conditional expression (5A) and the other of them satisfy the following conditional expression (5B):

$$\nu_{dpone} > 60 \qquad (5A),$$

and $$\nu_{dpoth} < 60 \qquad (5B)$$

where $\nu_{dpone}$ is the Abbe constant of one of the first and second positive lens elements with respect to the d-line, and $\nu_{dpoth}$ is the Abbe constant of the other of the first and second positive lens elements with respect to the d-line.

In an optical system having a high zoom ratio and a relatively small overall optical length, if the materials for the first and second positive lens elements are so selected that both the above conditional expressions (5A) and (5B) are satisfied, one of the positive lens elements has a large relative partial dispersion, enabling efficient reduction of chromatic aberration of magnification in the first lens unit with small secondary spectrum.

In addition, it is preferred that the difference between the refractive index of the first positive lens element and the refractive index of the second positive lens element satisfy the following conditional expression (A):

$$0.1 < n_{dp1} - n_{dp2} < 0.65 \qquad (A)$$

where $n_{dp1}$ is the refractive index with respect to the d-line of one of the first and second positive lens elements that has an Abbe constant smaller than that of the other, and $n_{dp2}$ is the refractive index with respect to the d-line of the other of the first and second positive lens elements.

If the difference in the refractive indices of the two positive lens elements is so large that the lower limit of conditional expression (A) is reached, the lens element that is larger in the Abbe constant can provide correction of chromatic aberration, and the other lens element can have an appropriately high refracting power, which is advantageous for achieving a high zoom ratio.

If the upper limit of conditional expression (A) is not exceeded, an increase in the cost of the material of the positive lens elements can be prevented.

In the image pickup apparatus according to the present invention, it is preferred that the third lens unit and the fourth lens unit each have a positive refracting power, the aperture stop and the third lens unit be kept stationary during zooming from the wide angle end to the telephoto end, and the fourth lens unit be moved along the optical axis during zooming from the wide angle end to the telephoto end.

If the third lens unit has a positive refracting power, the effective diameter of the fourth lens unit can readily be made small. This leads to a reduction in the diameter (and slimming of the image pickup apparatus).

In addition, the fourth lens unit can have the function of changing the magnification or the function of adjusting the position of the image plane with its movement along the optical axis.

It is also preferred that the fifth lens unit have a positive refracting power, and the fifth lens unit be kept stationary during zooming from the wide angle end to the telephoto end.

If the fifth lens unit has a positive refracting power, the exit pupil can easily be made distant from the image plane. This facilitates a reduction in the effect of shading.

In addition, keeping the fifth lens unit stationary makes the number of the movable lens units in the rear lens unit group small, leading to a simplification of the structure.

It is also preferred that the fifth lens unit have a negative refracting power, a sixth lens unit having a positive refracting power be provided on the image side of the fifth lens unit, the distance between the fifth lens unit and the sixth lens unit change during zooming from the wide angle end to the telephoto end, and the fifth lens unit move during focusing.

Having a negative lens unit in the rear lens unit group enables a reduction in the effective diameter of the third and fourth lens units. This is advantageous for slimming of the optical system and for correction of curvature of field.

Furthermore, focusing by the fifth lens unit leads to a reduction in the size of the optical system.

It is preferred that the fourth lens unit satisfy the following conditional expression (6):

$$0.1 < f_{4G}/f_T < 0.6 \qquad (6),$$

where $f_{4G}$ is the focal length of the fourth lens unit, and $f_T$ is the focal length of the entire zoom lens system at the telephoto end.

Conditional expression (6) specifies a preferred range of the focal length of the fourth lens unit having a positive refracting power.

If the lower limit of conditional expression (6) is reached, the refracting power of the fourth lens unit will be prevented from becoming unduly high. This is advantageous for reduction of aberrations.

If the upper limit of conditional expression (6) is not exceeded, the amount of movement of the fourth lens unit for magnification change can be made small. This is advantageous for achieving both a high zoom ratio and compactness.

It is also preferred that the lens unit located closest to the image side among the lens units in the zoom lens satisfy the following conditional expression (7):

$$0.1 < f_{RG}/f_T < 0.8 \tag{7},$$

where $f_{RG}$ is the focal length of the lens unit located closest to the image side among the lens units in the zoom lens, and $f_T$ is the focal length of the entire zoom lens system at the telephoto end.

Conditional expression (7) specifies a preferred range of the focal length of the lens unit located closest to the image side.

If the lower limit of conditional expression (7) is reached, the refracting power of the lens unit closest to the image side will be prevented from becoming unduly high. This is advantageous for reduction of aberrations.

If the upper limit of conditional expression (7) is not exceeded, the lens unit located closest to the image side will have an appropriately high positive refracting power, and the exit pupil can easily be made distant from the image plane. This facilitates reduction of shading.

It is more preferred that two or more of the above described features be adopted in combination.

In conditional expression (1), it is more preferred that the lower limit value be 7.5, still more preferably 8, still more preferably 9, and the upper limit value be 24, still more preferably 12.

In conditional expression (2), it is more preferred that the lower limit value be 0.6, still more preferably 0.7, still more preferably 1.0, and the upper limit value be 1.36, still more preferably 1.34.

In conditional expression (3), it is more preferred that the lower limit value be 20, still more preferably 25, still more preferably 30, and the upper limit value be 65, still more preferably 60, still more preferably 45.

In conditional expression (4), it is more preferred that the lower limit value be 2.5, still more preferably 2.6, still more preferably 2.7, and the upper limit value be 13, still more preferably 10, still more preferably 5.

In conditional expression (5A), it is more preferred that the lower limit value be 65, still more preferably 70. In conditional expression (5B), it is more preferred that the upper limit value be 55, still more preferably 50.

In conditional expression (6), it is more preferred that the lower limit value be 0.2, still more preferably 0.25, and the upper limit value be 0.45, still more preferably 0.35.

In conditional expression (7), it is more preferred that the lower limit value be 0.15, still more preferably 0.2, and the upper limit value be 0.7, still more preferably 0.6.

In conditional expression (A), it is more preferred that the lower limit value be 0.15, still more preferably 0.2, and the upper limit value be 0.5, still more preferably 0.4.

The image pickup apparatus according to the third mode of the present invention has a zoom lens and an image pickup element having an image pickup surface for converting an image formed by the zoom lens into an electrical signal, wherein the zoom lens comprises, in order from the object side to the image side, a first lens unit having a positive refracting power including a reflecting member having a reflecting surface that deflects the optical path, a second lens unit having a negative refracting power, and a rear lens unit group having a positive refracting power as a whole and comprising at least three lens units including, in order from the object side, a third lens unit, a fourth lens unit, and a fifth lens unit, the zoom lens has an aperture stop disposed between the second lens unit and the fourth lens unit, the first lens unit is kept stationary during zooming from the wide angle end to the telephoto end, the second lens unit moves during zooming in such a way that it is located closer to the image side at the telephoto end than at the wide angle end, the distances between the lens units change during zooming, the first lens unit includes, in order from the object side to the image side, a negative lens component, the reflecting member and a rear sub-lens unit including a first positive lens element and a second positive lens element, the second lens unit includes a plurality of lens elements including a negative lens element, and the following conditional expressions (1), (2), and (AA) are satisfied:

$$7 < f_T/f_W < 30 \tag{1},$$

$$0.5 < f_W/IH < 1.38 \tag{2},$$

and $$-0.2 < f_{2G}/f_T < -0.05 \tag{AA},$$

where $f_T$ is the focal length of the entire zoom lens system at the telephoto end, $f_W$ is the focal length of the entire zoom lens system at the wide angle end, IH is the highest image height in an effective image pickup area on the image pickup surface, $f_{2G}$ is the focal length of the second lens unit, and the term "lens component" refers to a lens member composed of a single lens element or a cemented lens component delimited by effective lens surfaces that are in contact with air.

In the image pickup apparatus according to the third mode, since the optical path is deflected by the reflecting member in the first lens unit, the thickness of the image pickup apparatus can be made smaller advantageously.

Therefore, the zoom lens can easily be designed to have a constant overall length, and the second lens unit can appropriately provide the magnification changing effect. In addition, the use of a plurality of lens units in the zoom lens is advantageous for achieving an appropriate zoom ratio and for reducing the variation of aberrations.

Moreover, two positive lens elements are used in the first lens unit in order to achieve an appropriate zoom ratio. This is advantageous for correction of monochromatic aberrations. In addition, a plurality of lens elements are provided in the second lens unit in order that correction of aberrations can easily be achieved even if the second lens unit has an appropriately high negative refracting power.

Conditional expression (1) specifies a preferred range of the zoom ratio.

As the lower limit of conditional expression (1) is reached, the user can enjoy variations of the angle of view and can capture objects in the image frame in various shooting situations.

As the upper limit of conditional expression (1) is not exceeded, camera shake that can be caused by a large F-number at the telephoto end of the zoom range and noises in the image that can be generated with a gain increase for raising the effective sensitivity can readily be reduced.

Conditional expression (2) relates to a preferred range of the angle of view at the wide angle end.

If the lower limit of conditional expression (2) is reached, distortion can easily be made small and an increase in the number of lenses in the first lens unit can be prevented.

If the upper limit of conditional expression (2) is not exceeded, an advantage is obtained in shooting situations in which the distance between the apparatus and the subject is not so large as is the case with indoor shooting.

Conditional expression (AA) specifies a preferred range of the focal length of the second lens unit.

If the upper limit of conditional expression (AA) is reached, the amount of movement of the second lens unit can be made small while achieving an appropriately high zoom ratio. This is advantageous for reduction of the overall length of the zoom lens and slimming of the apparatus. In addition, the position of entrance pupil can be made closer to the object side. This is advantageous for achieving good imaging performance in the peripheral region at the wide angle end and for achieving a wide angle of view with a small size zoom lens.

If the refractive power of the second lens unit is so low that the upper limit of conditional expression (AA) is not exceeded, the curvature of each lens surface can be prevented from becoming unduly high. This is advantageous for reduction of aberrations (in particular, distortion and astigmatism at the wide angle end and axial chromatic aberration, chromatic aberration of magnification and coma at the telephoto end). In addition, adverse effects of decentering of lenses can be made small.

If the zoom lens has a focusing function, the features described in the foregoing should be interpreted as those for the state in which the zoom lens is focused on an object at the longest distance. The features described in the following should also be interpreted as those for the state in which the zoom lens is focused on an object at the longest distance.

According to another mode of the present invention, the rear lens unit group may include at least three lens units each having a positive refracting power, and the zoom lens may satisfy the following conditional expressions (4) and (3) instead of conditional expressions (1) and (2):

$$2.35 < |\Delta_{2G}/f_W| < 15 \quad (4),$$

and $$16.5 < |\nu_{dp1} - \nu_{dp2}| < 80 \quad (3),$$

where $\Delta_{2G}$ is the displacement of the position of the second lens unit at the telephoto end from the position of the second lens unit at the wide angle end with a displacement toward the image side being represented by a positive value, $f_W$ is the focal length of the entire zoom lens system at the wide angle end, $\nu_{dp1}$ is the Abbe constant of the first positive lens element in the first lens unit with respect to the d-line, and $\nu_{dp2}$ is the Abbe constant of the second positive lens element in the first lens unit with respect to the d-line.

The image pickup apparatus according to the fourth mode of the present invention has a zoom lens and an image pickup element having an image pickup surface for converting an image formed by the zoom lens into an electrical signal, wherein the zoom lens comprises, in order from the object side to the image side, a first lens unit having a positive refracting power including a reflecting member having a reflecting surface that deflects the optical path, a second lens unit having a negative refracting power, and a rear lens unit group having a positive refracting power as a whole and comprising a plurality of lens units including, in order from the object side, a third lens unit, a fourth lens unit, and a fifth lens unit, the zoom lens has an aperture stop disposed between the second lens unit and the fourth lens unit, the first lens unit is kept stationary during zooming from the wide angle end to the telephoto end, the second lens unit moves during zooming in such a way that it is located closer to the image side at the telephoto end than at the wide angle end, the distances between the lens units change during zooming, the first lens unit includes, in order from the object side to the image side, a negative lens component, the reflecting member and a rear sub-lens unit including a first positive lens element and a second positive lens element, the second lens unit includes a plurality of lens elements including a negative lens element, the rear lens unit group includes at least three lens units each having a positive refracting power, and the following conditional expressions (3), (4A), and (AA) are satisfied:

$$-0.2 < f_{2G}/f_T < -0.05 \quad (AA),$$

$$1.8 < \Delta_{2G}/f_W < 15 \quad (4A),$$

and $$16.5 < |\nu_{dp1} - \nu_{dp2}| < 80 \quad (3),$$

where $f_T$ is the focal length of the entire zoom lens system at the telephoto end, $f_W$ is the focal length of the entire zoom lens system at the wide angle end, $f_{2G}$ is the focal length of the second lens unit, $\Delta_{2G}$ is the displacement of the position of the second lens unit at the telephoto end from the position of the second lens unit at the wide angle end with a displacement toward the image side being represented by a positive value, $\nu_{dp1}$ is the Abbe constant of the first positive lens element in the first lens unit with respect to the d-line, $\nu_{dp2}$ is the Abbe constant of the second positive lens element in the first lens unit with respect to the d-line, the term "lens component" refers to a lens member composed of a single lens element or a cemented lens component delimited by effective lens surfaces that are in contact with air and the Abbe constant is defined as $(n_{d1}-1)/(n_{F1}-n_{C1})$ with $n_{d1}$, $n_{C1}$, and $n_{F1}$ being the refractive indices of the first or second positive lens element with respect to the d-line, the C-line, and the F-line respectively.

In order to achieve an appropriately large angle of view at the wide angle end, it is necessary for the composite system made up of the third and subsequent lens units to have an adequately high positive refracting power.

According to the fourth mode of the invention, the rear lens unit group includes at least three lens units each having a positive refracting power. Therefore, these lens units each having a positive refracting power can contribute to the positive refracting power. This is advantageous for achieving good performance.

Conditional expression (4A) specifies a range of the amount of movement of the second lens unit that is preferred for achieving an appropriate zoom ratio and an appropriate angle of view and for size reduction.

As the amount of movement of the second lens unit is so large that the lower limit of conditional expression (4A) is reached, the entire zoom lens system can constitute a retrofocus system at the wide angle end of the zoom range, enabling to achieve an adequate angle of view.

In addition, the second lens unit can efficiently provide the magnification change. Therefore, the refracting power of the second lens unit can be made smaller. This facilitates reduction of aberrations in the second lens unit.

As the amount of movement of the second lens unit is so small that the upper limit of conditional expression (4A) is not exceeded, the entrance pupil can easily be made closer to the first lens unit. Thus, the effective diameter of the first lens unit can be prevented from becoming large. This is advantageous for reduction in the size of the image pickup apparatus while achieving an appropriate angle of view.

Conditional expression (3) specifies a preferred range of the difference in the Abbe constant between the first positive lens element and the second positive lens element in the first lens unit.

If the difference in the Abbe constants is so large as to be larger than the lower limit of conditional expression (3) in optical systems having a high zoom ratio and not so large overall optical length, it is possible to efficiently suppress chromatic aberration of magnification in the first lens unit.

If the upper limit of conditional expression (3) is not exceeded, the ease of manufacturing of the positive lens elements used in combination can be prevented from being deteriorated. This enhances cost-effectiveness also.

The image pickup apparatus according to the fourth mode also has the advantages same as the third mode.

In the image pickup apparatus according to the fourth mode, it is preferred that the third lens unit have a positive refracting power, the fourth lens unit have a positive refracting power, and the fifth lens unit have a positive refracting power.

In this type of five-unit zoom lens with a positive-negative-positive-positive-positive configuration, the second lens unit can be designed to provide the principal magnification change.

To achieve an appropriately large angle of view at the wide angle end, it is necessary for the composite system made up of the third and subsequent lens units to have an adequately high positive refracting power. With the use of the three lens units each having a positive refracting power, the positive refracting powers can be distributed to these lens units. This is advantageous for achieving size reduction with a reduced number of lens units and for achieving good performance.

In the image pickup apparatus according to the third mode, it is preferred that the rear lens unit group include at least three lens units each having a positive refracting power.

Furthermore, it is preferred that the third lens unit have a positive refracting power, the fourth lens unit have a positive refracting power, and the fifth lens unit have a positive refracting power.

It is also preferred that the following conditional expression (4A) be satisfied:

$$1.8 < \Delta_{2G}/f_W < 15 \tag{4A}$$

where $f_W$ is the focal length of the entire zoom lens system at the wide angle end, $\Delta_{2G}$ is the displacement of the position of the second lens unit at the telephoto end from the position of the second lens unit at the wide angle end with a displacement toward the image side being represented by a positive value, and the term "lens component" refers to a lens member composed of a single lens element or a cemented lens component delimited by effective lens surfaces that are in contact with air.

It is also preferred that the following conditional expression (3) be satisfied:

$$16.5 < |v_{dp1} - v_{dp2}| < 80 \tag{3}$$

where $v_{dp1}$ is the Abbe constant of the first positive lens element in the first lens unit with respect to the d-line, $v_{dp2}$ is the Abbe constant of the second positive lens element in the first lens unit with respect to the d-line, the term "lens component" refers to a lens member composed of a single lens element or a cemented lens component delimited by effective lens surfaces that are in contact with air, and the Abbe constant is defined as $(n_{d1}-1)/(n_{F1}-n_{C1})$ with $n_{d1}$, $n_{C1}$, and $n_{F1}$ being the refractive indices of the first or second positive lens element with respect to the d-line, the C-line, and the F-line respectively.

It is preferred that the apparatuses according to the third and fourth modes satisfy at least one of the following features. It is more preferred that the apparatuses according to the third and fourth modes satisfy two or more of the following features.

It is preferred that the lens element located closest to the object side in the second lens unit satisfy the following conditional expression (B):

$$N_{dn1} \geq 1.60 \tag{B}$$

where $N_{dn1}$ is the refractive index with respect to the d-line of the negative lens element located closest to the object side among the lens elements in the second lens unit.

If the refractive index of this lens element is so large as not to be smaller than the lower limit of conditional expression (B), the absolute value of the curvature of this lens element can be made low. This is advantageous for correction of aberrations (in particular off-axis aberrations at zoom positions near the wide angle end).

It is preferred that the second lens unit include a first negative lens element in the form of a single lens element, and a cemented lens component made up of a second negative lens element and a positive lens element, the image side surface of the first negative lens element and the image side surface of the second negative lens element be both concave surfaces, and the following conditional expression (C) be satisfied:

$$2.0 < SF_{2G} < 30.0 \tag{C}$$

where $SF_{2G}$ is defined by the equation $SF_{2G} = |(R_1 + R_2)/(R_1 - R_2)|$, $R_1$ is the paraxial radius of curvature of the image side surface of the first negative lens element, and $R_2$ is the paraxial radius of curvature of the image side surface of the second negative lens element in the cemented lens component.

If the lower limit of conditional expression (C) is reached, the image side surface of the first negative lens element can have appropriate curvature, and the curvature of the image side surface of the second negative lens element can be made appropriately low. Therefore, the second negative lens element can be prevented from having an excessively high refracting power, and overcorrection of aberrations and axial chromatic aberration can easily be made small.

If the upper limit of conditional expression (C) is not exceeded, the curvature of the image side surface of the first negative lens element can be made appropriately low, and the image side surface of the second negative lens element can have appropriate curvature. Therefore, the second negative lens element can have an appropriate refracting power, and correction of aberrations and axial chromatic aberration can easily be achieved.

It is preferred that the negative lens element located closest to the object side in the second lens unit have an aspheric lens surface. This is advantageous for achieving both an appropriate negative refracting power in the paraxial region and correction of off-axis aberrations such as coma at the wide angle end.

It is also preferred that the following conditional expression (D) be satisfied:

$$1.0 < L_T/f_T < 2.0 \tag{D}$$

where $L_T$ is the sum of the back focus and the distance from the entrance surface of the zoom lens to an exit lens surface of the zoom lens at the telephoto end, and the back focus is calculated as the equivalent air distance.

If the lower limit of conditional expression (D) is reached, the refracting powers of the lens units can be prevented from becoming excessively high. This is advantageous for correction of aberrations Not exceeding the upper limit of conditional expression (D) will lead to a reduction in the size of the image pickup apparatus.

It is preferred that the second lens unit satisfy the following conditional expression (E):

$$0.05 < \Delta_{2G}/f_T < 0.4 \tag{E}$$

where $\Delta_{2G}$ is the displacement of the position of the second lens unit at the telephoto end from the position of the second lens unit at the wide angle end with a displacement toward the image side being represented by a positive value.

If the lower limit of conditional expression (E) is reached, the refracting power of the second lens unit that is needed to achieve an appropriate zoom ratio can be made small. This is advantageous for correction of aberrations.

If the upper limit of conditional expression (E) is not exceeded, the amount of movement of the second lens unit can be made small. This is advantageous for reduction in the overall length.

It is preferred that the second lens unit satisfy the following conditional expression (F):

$$0.5 < \Sigma_{2G}/f_W < 1.0 \tag{F}$$

where $\Sigma_{2G}$ is the thickness of the second lens unit on the optical axis, and $f_W$ is the focal length of the entire zoom lens system at the wide angle end.

If the thickness of the second lens unit is so large that the lower limit of conditional expression (F) is reached, the second lens unit can include an appropriate number of lenses and air lenses. This is advantageous for correction of aberrations.

If the thickness of the second lens unit is so small that the upper limit of conditional expression (F) is not exceeded, a space for movement of the second lens unit can easily be provided.

It is preferred that the aperture stop be kept stationary during zooming from the wide angle end to the telephoto end.

This leads to a simplification of the mechanism and eliminates an unnecessary space for allowing movement of the aperture stop, facilitating size reduction.

It is preferred that the third lens unit have a positive refracting power, and the third lens unit and the aperture stop be kept stationary during zooming from the wide angle end to the telephoto end.

This leads to a simplification of the mechanism and makes the ray height in the movable lens units located on the rear side of the aperture stop low. This is advantageous for achieving both high zoom ratio and size reduction.

It is preferred that the third lens unit have a positive refracting power, the fourth lens unit have a positive refracting power, the fifth lens unit have a negative refracting power, and a sixth lens unit having a positive refracting power be provided on the image side of the fifth lens unit.

In this zoom lens having a positive-negative-positive-positive-negative-positive configuration (in order from the object side), having a negative lens unit in the rear lens unit group facilitates reduction of the effective diameter of the third and fourth lens units and reduction of the thickness of the optical system. This is also advantageous for correction of curvature of field. Moreover, focusing may be performed by moving the fifth lens unit. This will lead to a reduction in the size of the optical system.

It is preferred that one of the first positive lens element and the second positive lens element satisfy the following conditional expression (5A) and the other of them satisfy the following conditional expression (5B):

$$\nu_{dpone} > 60 \tag{5A}$$

and $$\nu_{dpoth} < 60 \tag{5B}$$

where $\nu_{dpone}$ is the Abbe constant of one of the first and second positive lens elements with respect to the d-line, and $\nu_{dpoth}$ is the Abbe constant of the other of the first and second positive lens elements with respect to the d-line.

In this apparatus with an optical system having a high zoom ratio and a relatively small overall optical length, if the materials for the first and second positive lens elements are so selected that both the above conditional expressions (5A) and (5B) are satisfied, one of the positive lens elements have a large relative partial dispersion, enabling efficient reduction of chromatic aberration of magnification in the first lens unit with small secondary spectrum.

In addition, it is preferred that the difference between the refractive index of the first positive lens element and the refractive index of the second positive lens element satisfy the following conditional expression (A):

$$0.1 < n_{dp1} - n_{dp2} < 0.65 \tag{A}$$

where $n_{dp1}$ is the refractive index with respect to the d-line of one of the first and second positive lens elements that has an Abbe constant smaller than that of the other, and $n_{dp2}$ is the refractive index with respect to the d-line of the other of the first and second positive lens elements.

If the difference in the refractive indices is so large that the lower limit of conditional expression (A) is reached, the lens element that is larger in the Abbe constant can provide correction of chromatic aberration, and the other lens element can have an appropriately high refracting power, which is advantageous for achieving a high zoom ratio.

If the upper limit of conditional expression (A) is not exceeded, an increase in the cost of the material of the positive lens elements can be prevented.

It is also preferred that the third lens unit and the fourth lens unit each have a positive refracting power, the aperture stop and the third lens unit be kept stationary during zooming from the wide angle end to the telephoto end, and the fourth lens unit be moved along the optical axis during zooming from the wide angle end to the telephoto end.

If the third lens unit has a positive refracting power, the effective diameter of the fourth lens unit can readily be made small. This leads to a reduction in the diameter (and slimming of the image pickup apparatus). In addition, the fourth lens unit can have the function of changing the magnification or the function of adjusting the position of the image plane with its movement along the optical axis.

It is also preferred that the fifth lens unit have a positive refracting power, and the fifth lens unit be kept stationary during zooming from the wide angle end to the telephoto end.

If the fifth lens unit has a positive refracting power, the exit pupil can easily be made distant from the image plane. This facilitates a reduction in the effect of shading.

In addition, keeping the fifth lens unit stationary makes the number of the movable lens units in the rear lens unit group small, leading to a simplification of the structure.

It is also preferred that the fifth lens unit have a negative refracting power, a sixth lens unit having a positive refracting power be provided on the image side of the fifth lens unit, the distance between the fifth lens unit and the sixth lens unit change during zooming from the wide angle end to the telephoto end, and the fifth lens unit move during focusing.

Thus having a negative lens unit in the rear lens unit group enables a reduction in the effective diameter of the third and fourth lens units. This is advantageous for slimming of the optical system and for correction of curvature of field. Furthermore, focusing by the fifth lens unit leads to a reduction in the size of the optical system.

It is preferred that the fourth lens unit satisfy the following conditional expression (6):

$$0.1 < f_{4G}/f_T < 0.6 \quad (6),$$

where $f_{4G}$ is the focal length of the fourth lens unit, and $f_T$ is the focal length of the entire zoom lens system at the telephoto end.

Conditional expression (6) specifies a preferred range of the focal length of the fourth lens unit having a positive refracting power.

If the lower limit of conditional expression (6) is reached, the refracting power of the fourth lens unit will be prevented from becoming unduly high. This is advantageous for reduction of aberrations.

If the upper limit of conditional expression (6) is not exceeded, the amount of movement of the fourth lens unit for magnification change can be made small. This is advantageous for achieving both a high zoom ratio and compactness.

It is also preferred that the lens unit located closest to the image side among the lens units in the zoom lens satisfy the following conditional expression (7):

$$0.1 < f_{RG}/f_T < 0.8 \quad (7),$$

where $f_{RG}$ is the focal length of the lens unit located closest to the image side among the lens units in the zoom lens, and $f_T$ is the focal length of the entire zoom lens system at the telephoto end.

Conditional expression (7) specifies a preferred range of the focal length of the lens unit located closest to the image side.

If the lower limit of conditional expression (7) is reached, the refracting power of the lens unit closest to the image side will be prevented from becoming unduly high. This is advantageous for reduction of aberrations.

If the upper limit of conditional expression (7) is not exceeded, the lens unit located closest to the image side will have an appropriately high positive refracting power, and the exit pupil can easily be made distant from the image plane. This facilitates reduction of shading.

It is preferred that the image pickup apparatus has an image transforming section that transforms, by image processing, an electrical signal representing an image having distortion attributed to the zoom lens output from the image pickup element into an image signal representing an image that is corrected in terms of distortion.

This can decrease the required level of distortion correction, and the number of negative lens components on the object side of the reflecting surface may be decreased to one or only a single negative lens element can be enough. This is advantageous for slimming of the image pickup apparatus.

It is more preferred that two or more of the above described features be adopted in combination.

In conditional expression (1), it is more preferred that the lower limit value be 7.5, still more preferably 8, still more preferably 9, and the upper limit value be 24, still more preferably 12.

In conditional expression (2), it is more preferred that the lower limit value be 0.6, still more preferably 0.7, still more preferably 1.0, and the upper limit value be 1.37, still more preferably 1.36.

In conditional expression (3), it is more preferred that the lower limit value be 20, still more preferably 22, still more preferably 24, and the upper limit value be 65, still more preferably 60, still more preferably 45.

In conditional expression (4A), it is more preferred that the lower limit value be 1.85, still more preferably 1.9, still more preferably 1.95, and the upper limit value be 13, still more preferably 10, still more preferably 5.

In conditional expression (5A), it is more preferred that the lower limit value be 65, still more preferably 70.

In conditional expression (5B), it is more preferred that the upper limit value be 55, still more preferably 50.

In conditional expression (6), it is more preferred that the lower limit value be 0.2, still more preferably 0.25, and the upper limit value be 0.45, still more preferably 0.33.

In conditional expression (7), it is more preferred that the lower limit value be 0.15, still more preferably 0.2, and the upper limit value be 0.7, still more preferably 0.6.

In conditional expression (A), it is more preferred that the lower limit value be 0.15, still more preferably 0.2, and the upper limit value be 0.5, still more preferably 0.4.

In conditional expression (AA), it is more preferred that the lower limit value be −0.19, still more preferably −0.18, and the upper limit value be −0.06, still more preferably −0.08.

In conditional expression (B), it is more preferred that the lower limit value be 1.65, still more preferably 1.70. In conditional expression (B), it is preferred from the viewpoint of material cost that an upper limit value of 2.7, more preferably 2.5 be set so that this limit is not exceeded.

In conditional expression (C), it is more preferred that the lower limit value be 2.5, still more preferably 3.0, and the upper limit value be 28.0, still more preferably 25.0.

In conditional expression (D), it is more preferred that the lower limit value be 1.1, still more preferably 1.2, and the upper limit value be 1.9, still more preferably 1.8.

In conditional expression (E), it is more preferred that the lower limit value be 0.1, still more preferably 0.15, and the upper limit value be 0.35, still more preferably 0.32.

In conditional expression (F), it is more preferred that the lower limit value be 0.5, still more preferably 0.6, and the upper limit value be 0.98, still more preferably 0.94.

According to the present invention, there can be provided an image pickup apparatus equipped with a zoom lens in which the variation in chromatic aberration can easily be made small even with a decreased overall length as well as an appropriate zoom ratio and an appropriate angle of view at the wide angle end of the zoom range.

According to the present invention, there can also be provided an image pickup apparatus equipped with a zoom lens that is advantageous for achieving reduction of the overall length while achieving good optical performance.

In the following, embodiments of the image pickup apparatus according to the present invention will be described in detail with reference to the drawings. It should be understood that the present invention is not limited by the embodiments.

EMBODIMENTS

In the following, first to seventh embodiments of the zoom lens used in the present invention will be described. FIGS. 1A, 2A, 3A, 4A, 5A, 6A, and 7A are cross sectional views of the zoom lenses according to the first to seventh embodiments in the state in which the they are focused on an object point at infinity at the wide angle end, FIGS. 1B, 2B, 3B, 4B, 5B, 6B, and 7B are cross sectional views of the zoom lenses according to the first to seventh embodiments in the state in which the they are focused on an object point at infinity at an intermediate focal length state, and FIGS. 1C, 2C, 3C, 4C, 5C, 6C, and 7C are cross sectional views of the zoom lenses according to to the first to seventh embodiments in the state in which the they are focused on an object point at infinity at the telephoto end. In FIGS. 1A to 7C, a first lens unit is denoted by a second lens unit is denoted by G2, a third lens unit is denoted by G3, a fourth lens unit is denoted by G4, a fifth lens unit is denoted by G5, a sixth lens unit is denoted by G6, an aperture stop is denoted by S, a plane parallel plate constituting a low pass filter on which wavelength range restriction coating for restricting infrared light is denoted by F, a plane parallel plate constituting a cover glass for an electronic image pickup element is denoted by C, and the image plane is denoted by I. The cover glass C may have a multi-layer film for wavelength range restriction applied on its surface. The cover glass C may be adapted to have the function of a low pass filter. The low-pass filtering function of the plane parallel plate F may be eliminated.

In all the embodiments, the position of the aperture stop S is fixed (i.e. immovable). All the numerical data presented below are for the state in which the zoom lens is focused on an object at infinity. In the numerical data, dimensions are in millimeters and angles are in degrees. In the first to third embodiments, the focusing operation is performed by moving the fourth lens unit G4. In the fourth to seventh embodiments, the focusing operation is performed by moving the fifth lens unit G5. Zoom data will be given for the wide angle end (WE), an intermediate zoom state (ST) defined in connection with the present invention, and the telephoto end (TE).

Figure 1B:
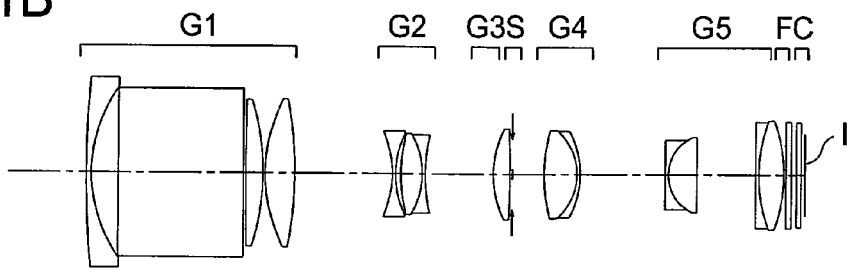
Figure 1C:
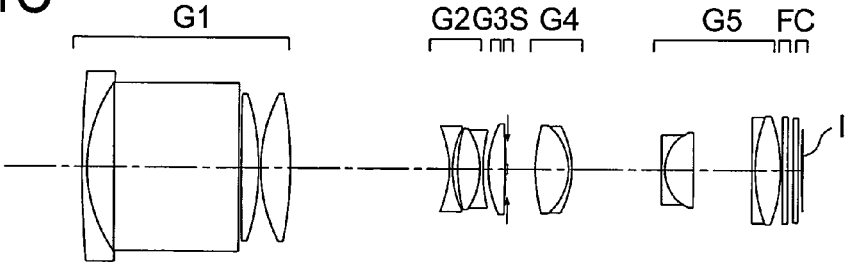

As shown in FIGS. 1A, 1B, and 1C, the zoom lens according to the first embodiment includes, in order from its object side, a first lens unit G1 having a positive refracting power, a second lens unit G2 having a negative refracting power, a third lens unit G3 having a positive refracting power, an aperture stop S, a fourth lens unit G4 having a positive refracting power, and a fifth lens unit having a positive refracting power.

During zooming from the wide angle end to the telephoto end, the first lens unit G1 is fixed, the second lens unit G2 moves toward the image side, the third lens unit G3 is fixed, the fourth lens unit G4 moves toward the object side, and the fifth lens unit G5 is fixed.

Figure 18:
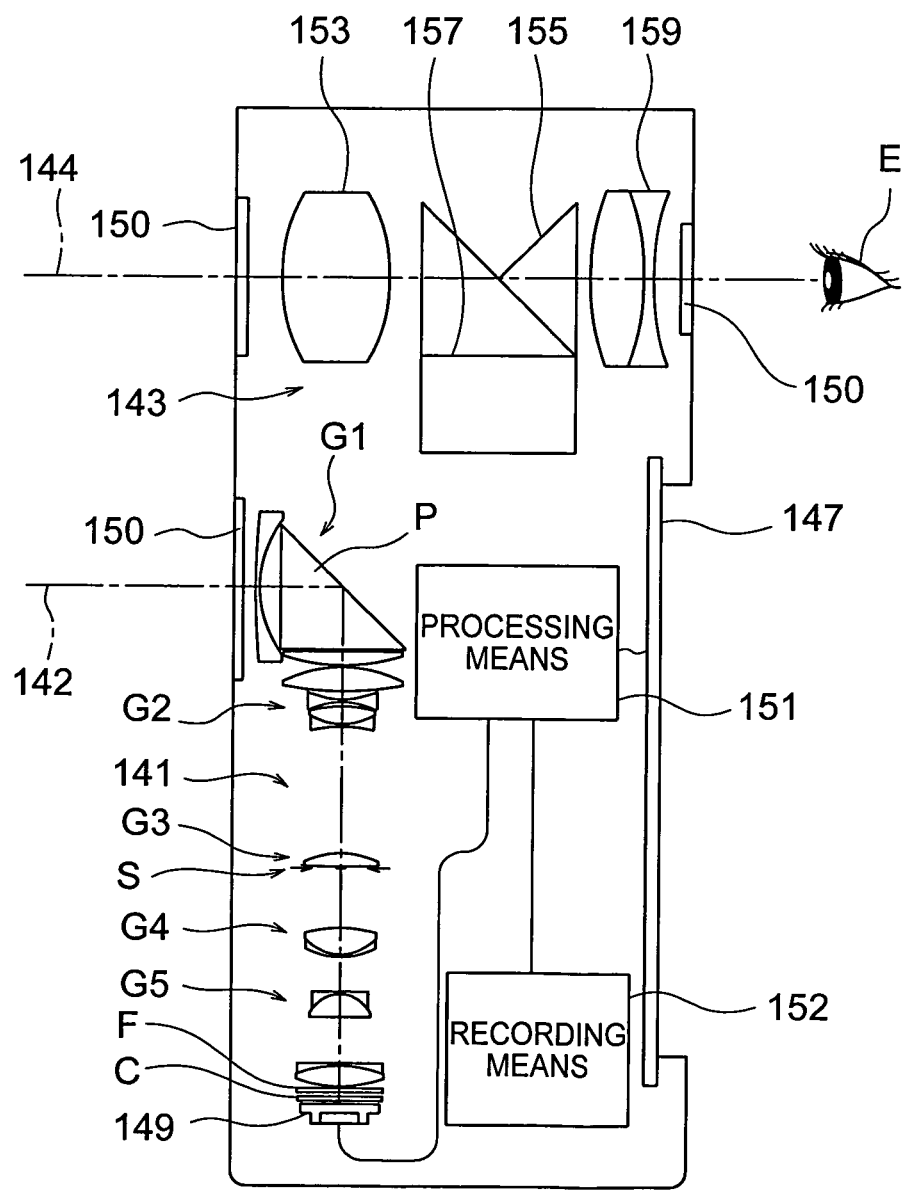
FIG. 18 is a cross sectional view of the digital camera.

The first lens unit G1 is composed of a negative meniscus lens having a convex surface directed toward the object side, a prism, a biconvex positive lens, and a biconvex positive lens. The second lens unit G2 is composed of a biconcave negative lens, and a cemented lens made up of a biconvex positive lens and a biconcave negative lens. The third lens unit G3 is composed of a biconvex positive lens. The fourth lens unit G4 is composed of a cemented lens made up of a biconvex positive lens and a negative meniscus lens having a convex surface directed toward the image side. The fifth lens unit G5 is composed of a cemented lens made up of a negative meniscus lens having a convex surface directed toward the object side and a positive meniscus lens having a convex surface directed toward the object side, and a cemented lens made up of a negative meniscus lens having a convex surface directed toward the object side and a biconvex positive lens. The lens elements in each of the lens units are arranged in the mentioned order from the object side. FIGS. 1A to 7C are extended views in which the reflecting surface of the prism is not illustrated. Actually, the prisms used in the first to seventh embodiments shown in FIGS. 1A to 7C are rectangular prisms as shown in FIG. 18.

There are eight aspheric surfaces, which include both surfaces of the object side biconvex positive lens in the first lens unit G1, the object side surface of the image side biconvex positive lens in the first lens unit G1, both surfaces of the object side biconcave negative lens in the second lens unit G2, both surfaces of the biconvex positive lens in the third lens unit G3, and the object side surface of the biconvex positive lens in the fourth lens unit G4.

Figure 2A:
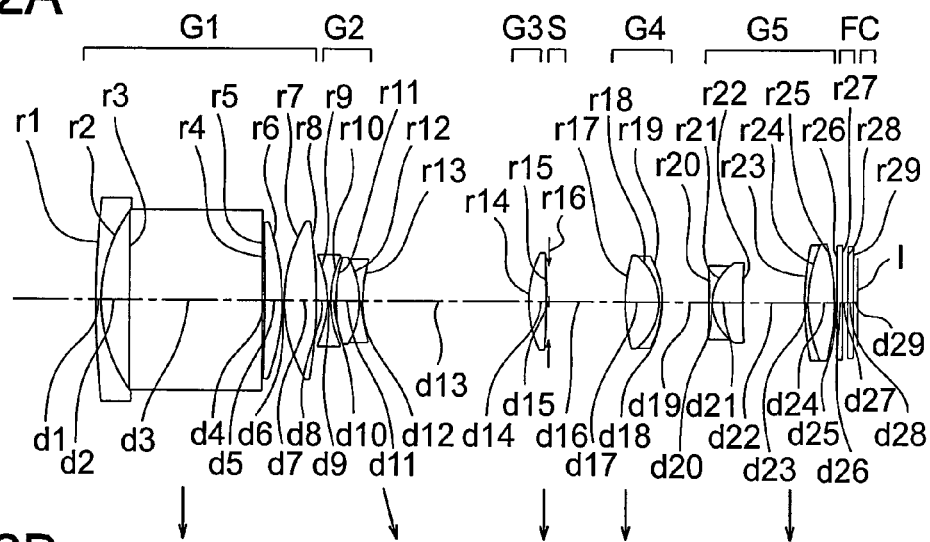
FIGS. 2A, 2B, and 2C are cross sectional views of a zoom lens according to a second embodiment of the present invention in the state in which the zoom lens is focused on an object point at infinity, respectively at the wide angle end, in an intermediate focal length state, and at the telephoto end.
Figure 2B:
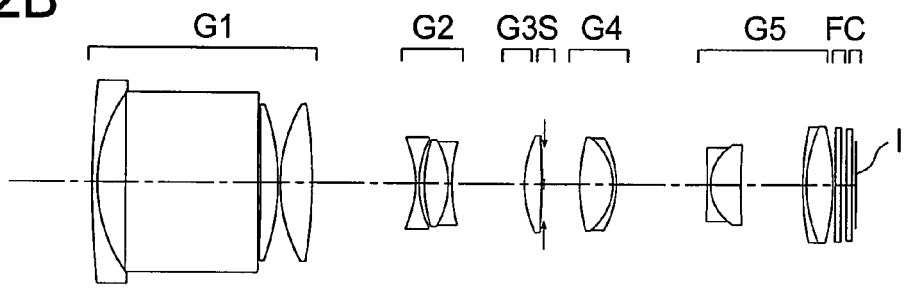
Figure 2C:
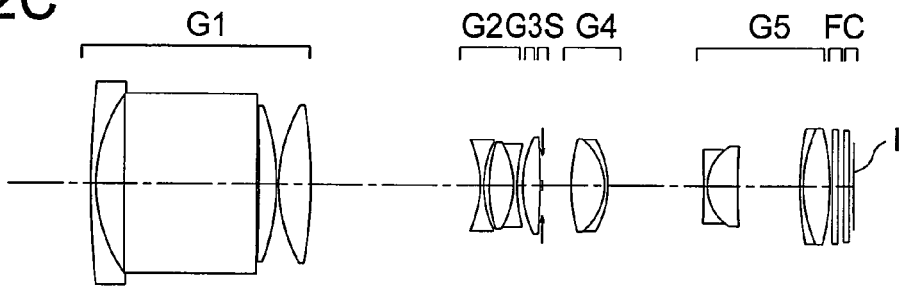

As shown in FIGS. 2A, 2B, and 2C, the zoom lens according to the second embodiment includes, in order from its object side, a first lens unit G1 having a positive refracting power, a second lens unit G2 having a negative refracting power, a third lens unit G3 having a positive refracting power, an aperture stop S, a fourth lens unit G4 having a positive refracting power, and a fifth lens unit having a positive refracting power.

During zooming from the wide angle end to the telephoto end, the first lens unit G1 is fixed, the second lens unit G2 moves toward the image side, the third lens unit G3 is fixed, the fourth lens unit G4 moves toward the object side, and the fifth lens unit G5 is fixed.

The first lens unit G1 is composed of a negative meniscus lens having a convex surface directed toward the object side, a prism, a positive meniscus lens having a convex surface directed toward the image side, and a biconvex positive lens. The second lens unit G2 is composed of a biconcave negative lens, and a cemented lens made up of a biconvex positive lens and a biconcave negative lens. The third lens unit G3 is composed of a biconvex positive lens. The fourth lens unit G4 is composed of a cemented lens made up of a biconvex positive lens and a negative meniscus lens having a convex surface directed toward the image side. The fifth lens unit G5 is composed of a cemented lens made up of a biconcave negative lens and a positive meniscus lens having a convex surface directed toward the object side, and a cemented lens made up of a negative meniscus lens having a convex surface directed toward the object side and a biconvex positive lens. The lens elements in each of the lens units are arranged in the mentioned order from the object side.

There are eight aspheric surfaces, which include both surfaces of the positive meniscus lens in the first lens unit G1, the object side surface of the biconvex positive lens in the first lens unit G1, both surfaces of the object side biconcave negative lens in the second lens unit G2, both surfaces of the biconvex positive lens in the third lens unit G3, and the object side surface of the biconvex positive lens in the fourth lens unit G4.

Figure 3A:
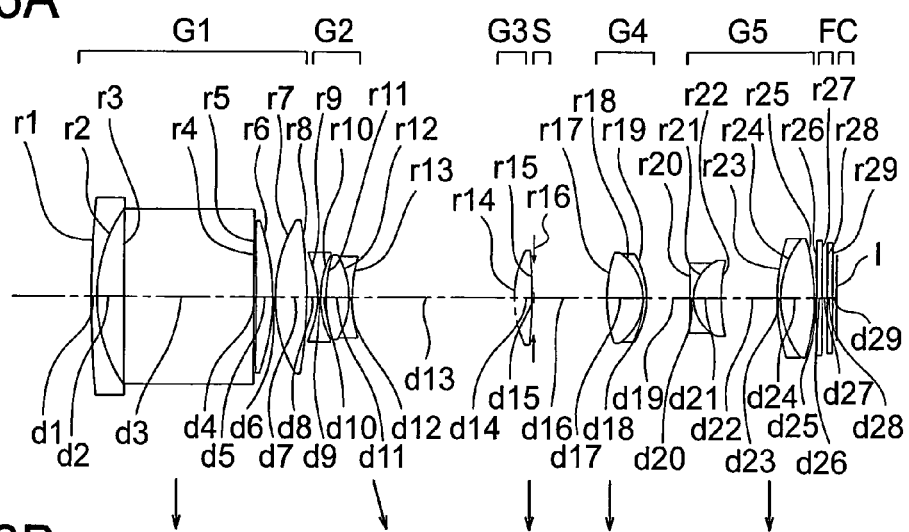
FIGS. 3A, 3B, and 3C are cross sectional views of a zoom lens according to a third embodiment of the present invention in the state in which the zoom lens is focused on an object point at infinity, respectively at the wide angle end, in an intermediate focal length state, and at the telephoto end.
Figure 3B:
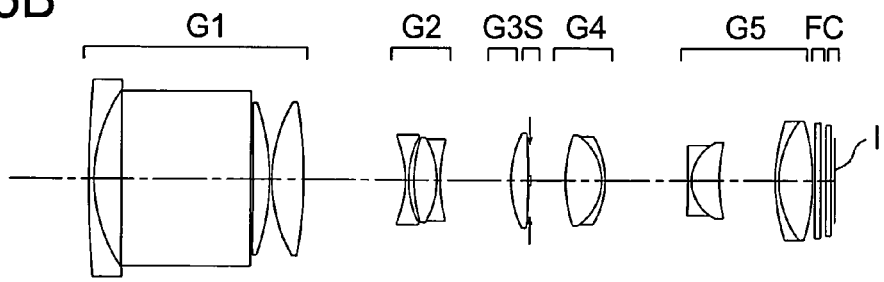
Figure 3C:
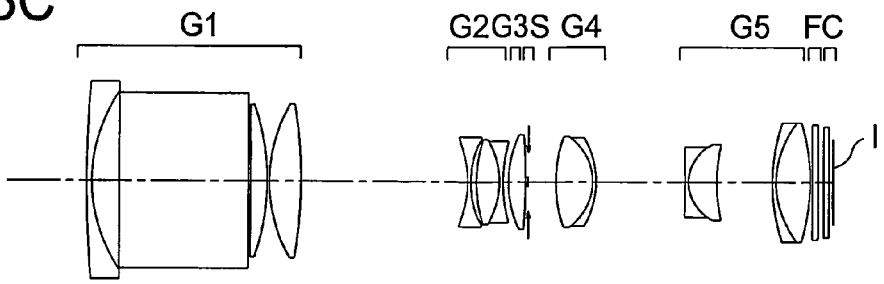

As shown in FIGS. 3A, 3B, and 3C, the zoom lens according to the third embodiment includes, in order from its object side, a first lens unit G1 having a positive refracting power, a second lens unit G2 having a negative refracting power, a third lens unit G3 having a positive refracting power, an aperture stop S, a fourth lens unit G4 having a positive refracting power, and a fifth lens unit having a positive refracting power.

During zooming from the wide angle end to the telephoto end, the first lens unit G1 is fixed, the second lens unit G2 moves toward the image side, the third lens unit G3 is fixed, the fourth lens unit G4 moves toward the object side, and the fifth lens unit G5 is fixed.

The first lens unit G1 is composed of a negative meniscus lens having a convex surface directed toward the object side, a prism, a positive meniscus lens having a convex surface directed toward the image side, and a biconvex positive lens. The second lens unit G2 is composed of a biconcave negative lens, and a cemented lens made up of a biconvex positive lens and a biconcave negative lens. The third lens unit G3 is composed of a biconvex positive lens. The fourth lens unit G4 is composed of a cemented lens made up of a biconvex positive lens and a negative meniscus lens having a convex surface directed toward the image side. The fifth lens unit G5 is composed of a cemented lens made up of a biconcave negative lens and a positive meniscus lens having a convex surface directed toward the object side, and a cemented lens made up of a negative meniscus lens having a convex surface directed toward the object side and a biconvex positive lens. The lens elements in each of the lens units are arranged in the mentioned order from the object side.

There are eight aspheric surfaces, which include both surfaces of the positive meniscus lens in the first lens unit G1, the object side surface of the biconvex positive lens in the first lens unit G1, both surfaces of the object side biconcave negative lens in the second lens unit G2, both surfaces of the biconvex positive lens in the third lens unit G3, and the object side surface of the biconvex positive lens in the fourth lens unit G4.

Figure 4A:
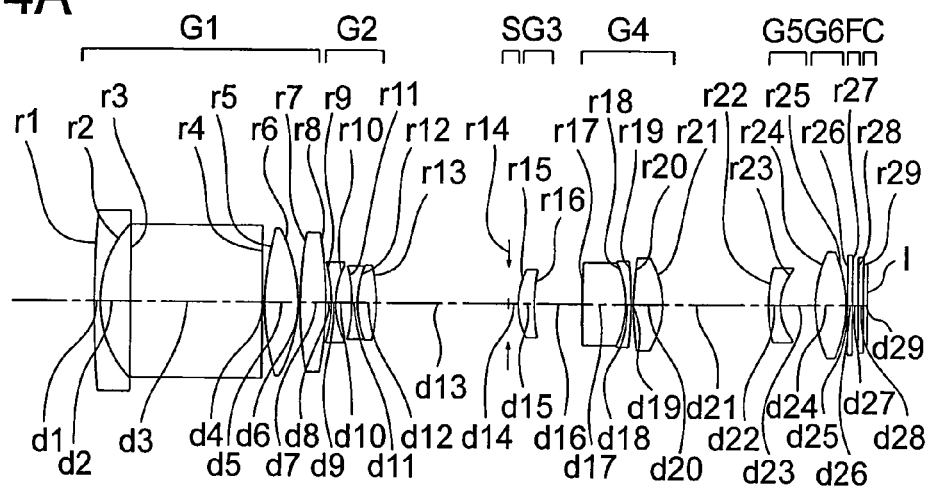
FIGS. 4A, 4B, and 4C are cross sectional views of a zoom lens according to a fourth embodiment of the present invention in the state in which the zoom lens is focused on an object point at infinity, respectively at the wide angle end, in an intermediate focal length state, and at the telephoto end.
Figure 4B:
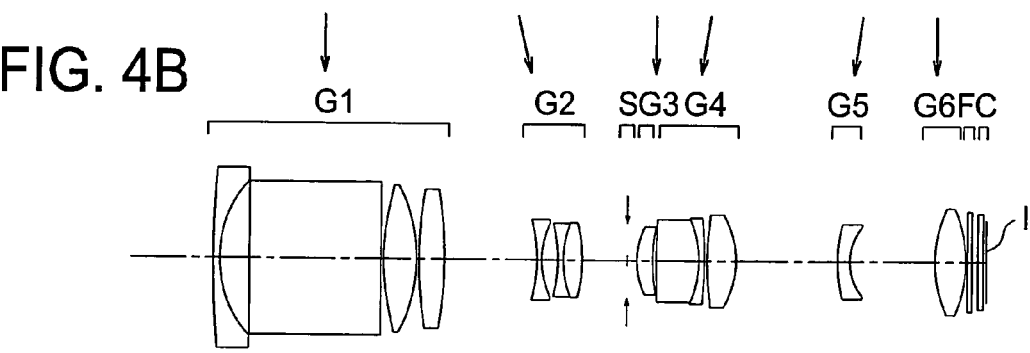
Figure 4C:
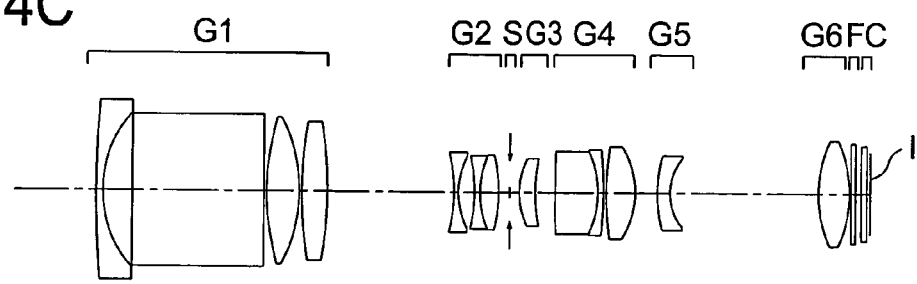

As shown in FIGS. 4A, 4B, and 4C, the zoom lens according to the fourth embodiment includes, in order from its object side, a first lens unit G1 having a positive refracting power, a second lens unit G2 having a negative refracting power, an aperture stop S, a third lens unit G3 having a positive refracting power, a fourth lens unit G4 having a positive refracting power, a fifth lens unit having a negative refracting power, and a sixth lens unit G6 having a positive refracting power.

During zooming from the wide angle end to the telephoto end, the first lens unit G1 is fixed, the second lens unit G2 moves toward the image side, the third lens unit G3 is fixed, the fourth lens unit G4 moves first toward the object side and thereafter moves toward the image side, the fifth lens unit G5 moves toward the object side, and the sixth lens unit G6 is fixed.

The first lens unit G1 is composed of a negative meniscus lens having a convex surface directed toward the object side, a prism, a biconvex positive lens, and a biconvex positive lens. The second lens unit G2 is composed of a biconcave negative lens, and a cemented lens made up of a biconcave negative lens and a biconvex positive lens. The third lens unit G3 is composed of a positive meniscus lens having a convex surface directed toward the object side. The fourth lens unit G4 is composed of a cemented lens made up of a biconvex positive lens and a negative meniscus lens having a convex surface directed toward the image side, and a biconvex positive lens. The fifth lens unit G5 is composed of a negative meniscus lens having a convex surface directed toward the object side. The sixth lens unit G6 is composed of a biconvex positive lens. The lens elements in each of the lens units are arranged in the mentioned order from the object side.

There are eight aspheric surfaces, which include the image side surface of the negative meniscus lens in the first lens unit G1, both surfaces of the object side biconvex positive lens in the first lens unit G1, both surfaces of the object side biconcave negative lens in the second lens unit G2, the object side surface of the positive meniscus lens in the third lens unit G3, and both surfaces of the image side biconvex positive lens in the fourth lens unit G4.

Figure 5A:
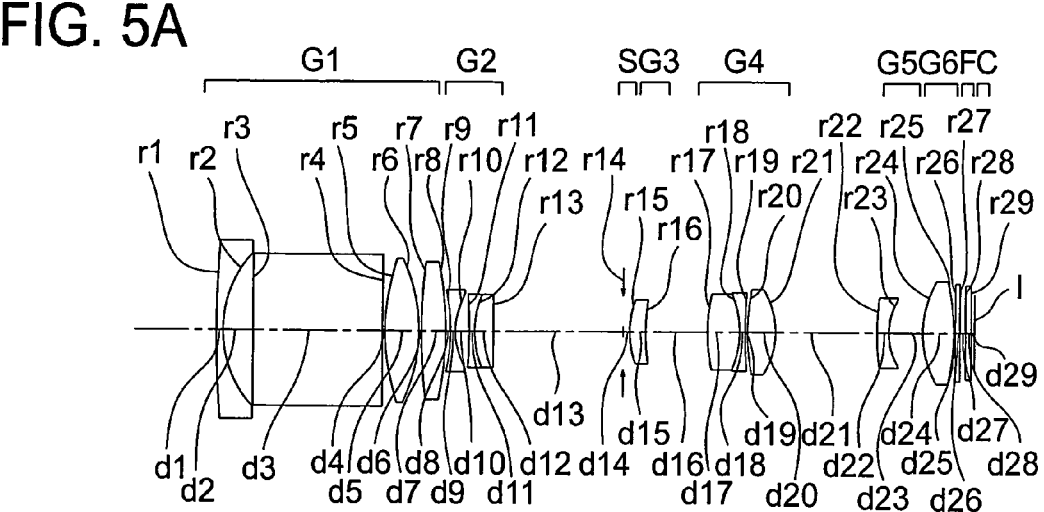
FIGS. 5A, 5B, and 5C are cross sectional views of a zoom lens according to a fifth embodiment of the present invention in the state in which the zoom lens is focused on an object point at infinity, respectively at the wide angle end, in an intermediate focal length state, and at the telephoto end.
Figure 5B:
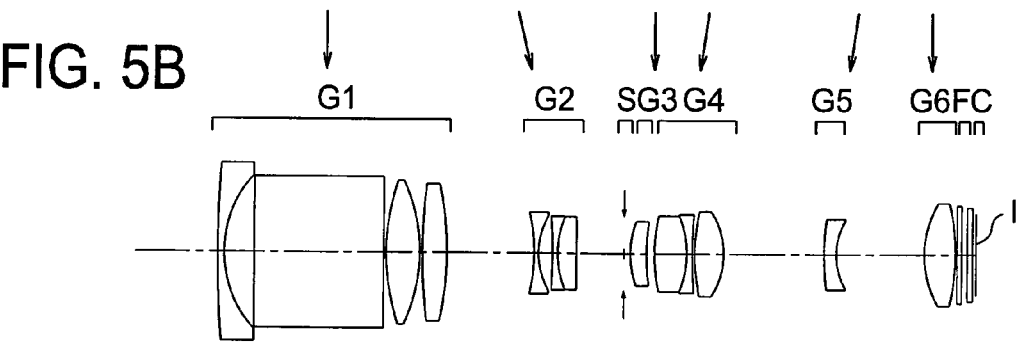
Figure 5C:
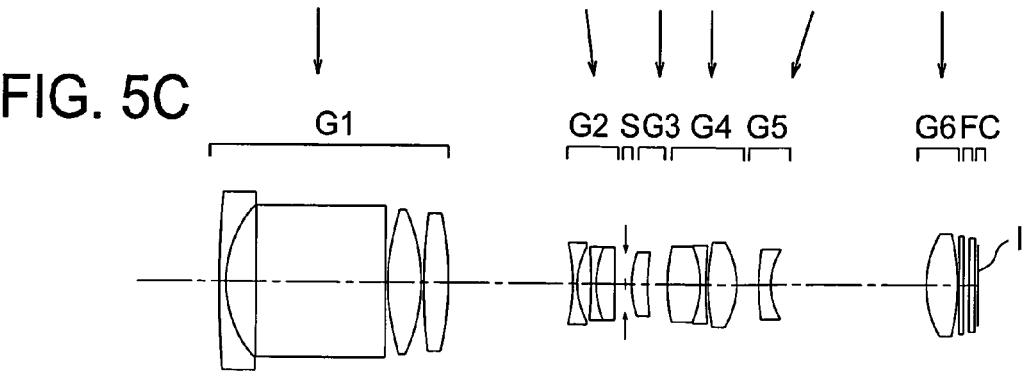

As shown in FIGS. 5A, 5B, and 5C, the zoom lens according to the fifth embodiment includes, in order from its object side, a first lens unit G1 having a positive refracting power, a second lens unit G2 having a negative refracting power, an aperture stop S, a third lens unit G3 having a positive refracting power, a fourth lens unit G4 having a positive refracting power, a fifth lens unit having a negative refracting power, and a sixth lens unit G6 having a positive refracting power.

During zooming from the wide angle end to the telephoto end, the first lens unit G1 is fixed, the second lens unit G2 moves toward the image side, the third lens unit G3 is fixed, the fourth lens unit G4 moves first toward the object side and thereafter moves toward the image side, the fifth lens unit G5 moves toward the object side, and the sixth lens unit G6 is fixed.

The first lens unit G1 is composed of a negative meniscus lens having a convex surface directed toward the object side, a prism, a biconvex positive lens, and a biconvex positive lens. The second lens unit G2 is composed of a biconcave negative lens, and a cemented lens made up of a biconcave negative lens and a biconvex positive lens. The third lens unit G3 is composed of a positive meniscus lens having a convex surface directed toward the object side. The fourth lens unit G4 is composed of a cemented lens made up of a biconvex positive lens and a biconcave negative lens and a biconvex positive lens. The fifth lens unit G5 is composed of a negative meniscus lens having a convex surface directed toward the object side. The sixth lens unit G6 is composed of a biconvex positive lens. The lens elements in each of the lens units are arranged in the mentioned order from the object side.

There are eight aspheric surfaces, which include the image side surface of the negative meniscus lens in the first lens unit G1, both surfaces of the object side biconvex positive lens in the first lens unit G1, both surfaces of the object side biconcave negative lens in the second lens unit G2, the object side surface of the positive meniscus lens in the third lens unit G3, and both surfaces of the image side biconvex positive lens in the fourth lens unit G4.

Figure 6A:
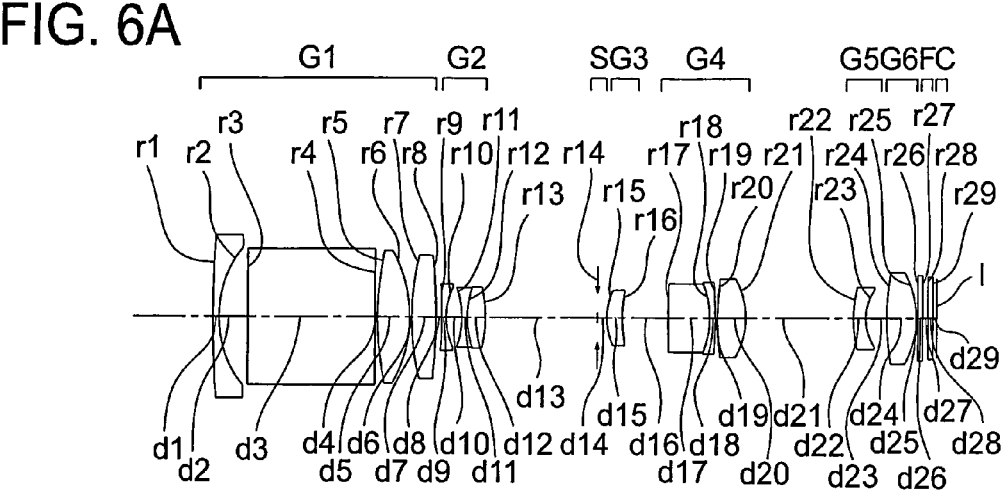
FIGS. 6A, 6B, and 6C are cross sectional views of a zoom lens according to a sixth embodiment of the present invention in the state in which the zoom lens is focused on an object point at infinity, respectively at the wide angle end, in an intermediate focal length state, and at the telephoto end.
Figure 6B:
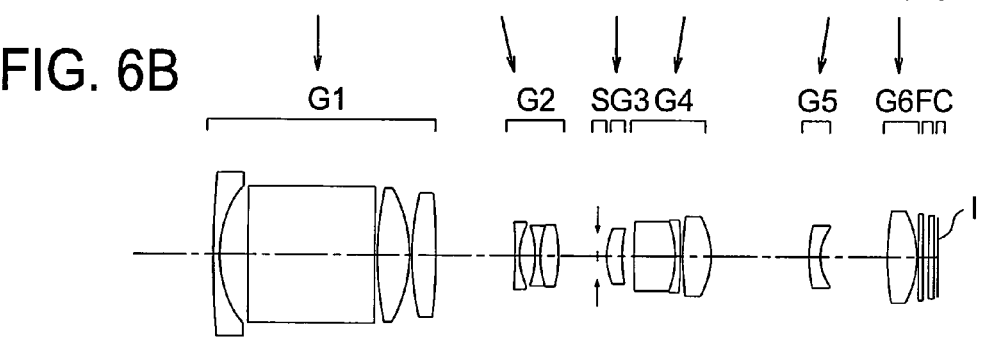
Figure 6C:
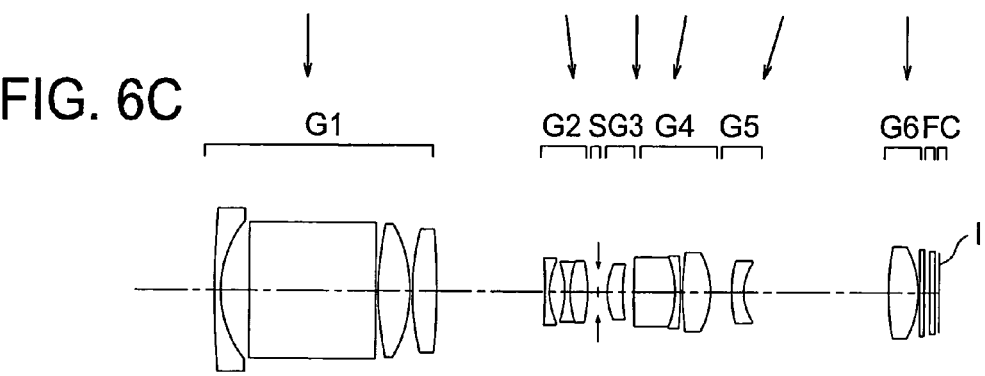

As shown in FIGS. 6A, 6B, and 6C, the zoom lens according to the sixth embodiment includes, in order from its object side, a first lens unit G1 having a positive refracting power, a second lens unit G2 having a negative refracting power, an aperture stop S, a third lens unit G3 having a positive refracting power, a fourth lens unit G4 having a positive refracting power, a fifth lens unit having a negative refracting power, and a sixth lens unit G6 having a positive refracting power.

During zooming from the wide angle end to the telephoto end, the first lens unit G1 is fixed, the second lens unit G2 moves toward the image side, the third lens unit G3 is fixed, the fourth lens unit G4 moves toward the object side, the fifth lens unit G5 moves toward the object side, and the sixth lens unit G6 is fixed.

The first lens unit G1 is composed of a negative meniscus lens having a convex surface directed toward the object side, a prism, a biconvex positive lens, and a biconvex positive lens. The second lens unit G2 is composed of a biconcave negative lens, and a cemented lens made up of a biconcave negative lens and a biconvex positive lens. The third lens unit G3 is composed of a positive meniscus lens having a convex surface directed toward the object side. The fourth lens unit G4 is composed of a cemented lens made up of a biconvex positive lens and a negative meniscus lens having a convex surface directed toward the image side, and a biconvex positive lens. The fifth lens unit G5 is composed of a negative meniscus lens having a convex surface directed toward the object side. The sixth lens unit G6 is composed of a biconvex positive lens. The lens elements in each of the lens units are arranged in the mentioned order from the object side.

There are eight aspheric surfaces, which include the image side surface of the negative meniscus lens in the first lens unit G1, both surfaces of the object side biconvex positive lens in the first lens unit G1, both surfaces of the object side biconcave negative lens in the second lens unit G2, the object side surface of the positive meniscus lens in the third lens unit G3, and both surfaces of the image side biconvex positive lens in the fourth lens unit G4.

Figure 7A:
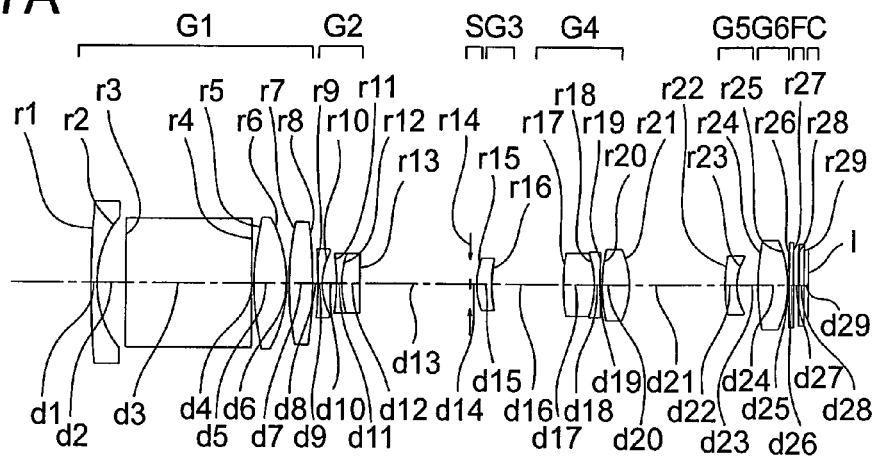
FIGS. 7A, 7B, and 7C are cross sectional views of a zoom lens according to a seventh embodiment of the present invention in the state in which the zoom lens is focused on an object point at infinity, respectively at the wide angle end, in an intermediate focal length state, and at the telephoto end.
Figure 7B:
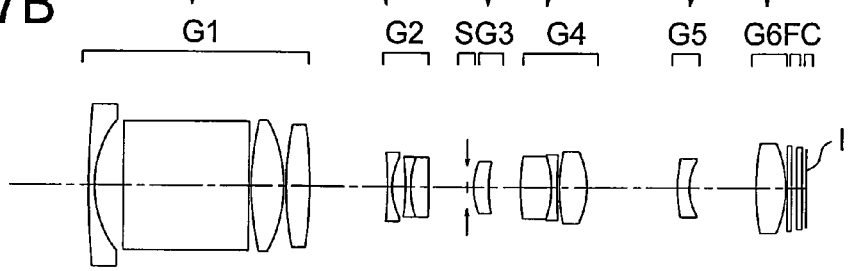
Figure 7C:
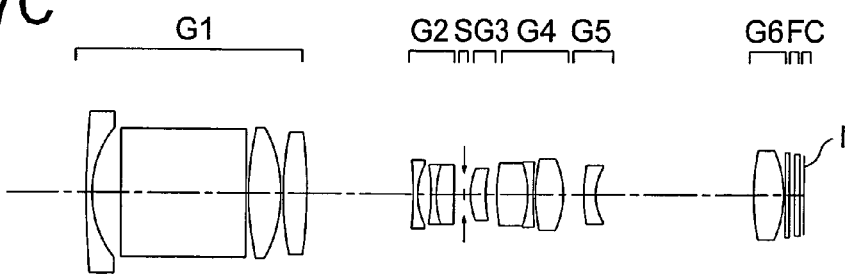
Figure 8A:
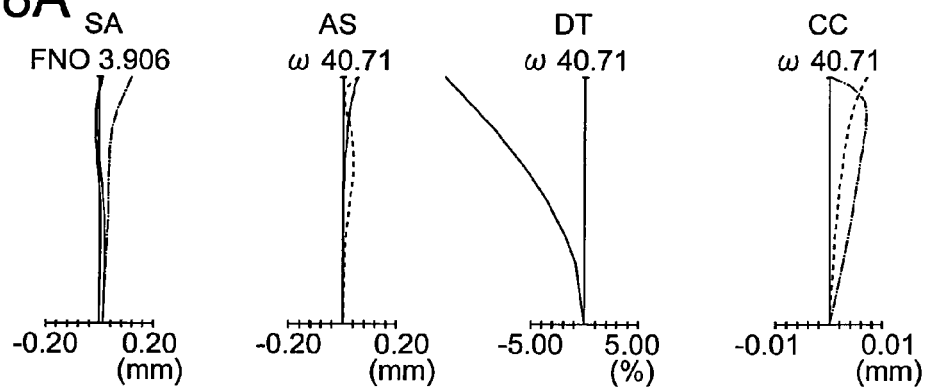
FIGS. 8A, 8B, and 8C show aberrations of the zoom lens according to the first embodiment in the state in which the zoom lens is focused on an object point at infinity.
Figure 8B:
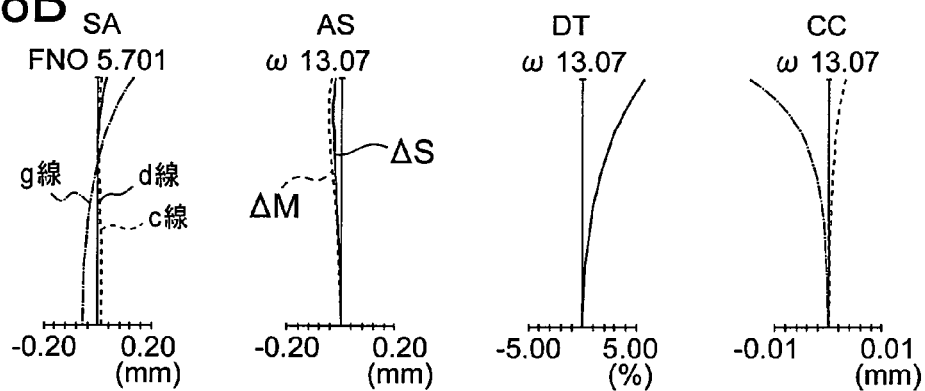
Figure 8C:
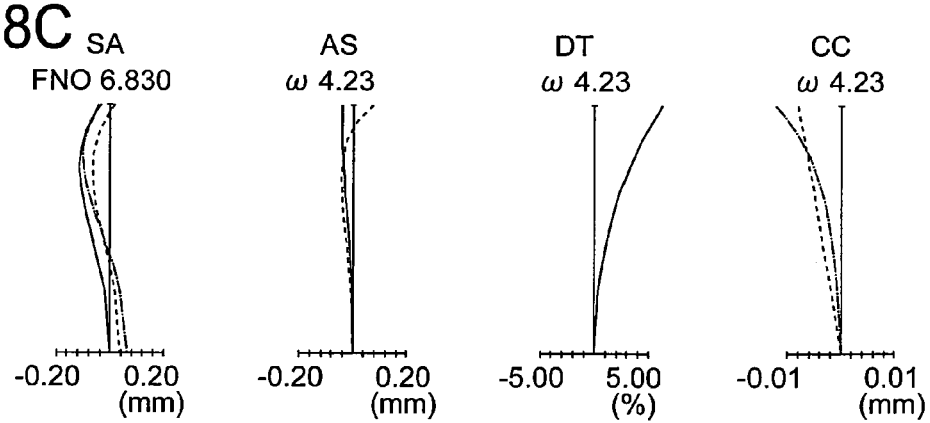
Figure 11A:
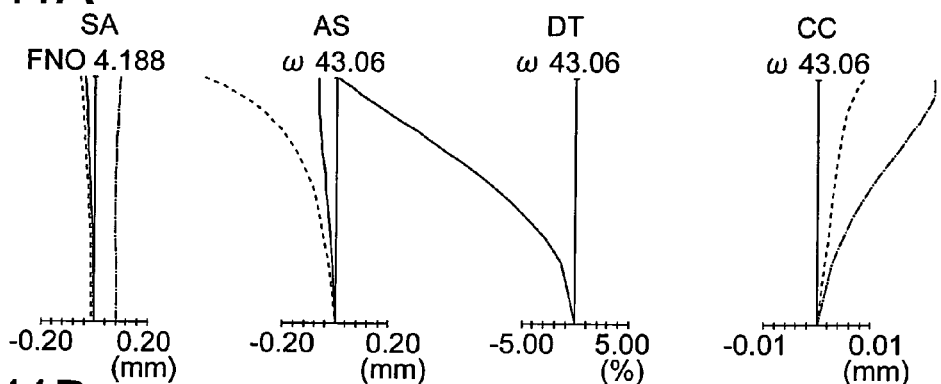
FIGS. 11A, 11B, and 11C show aberrations of the zoom lens according to the fourth embodiment in the state in which the zoom lens is focused on an object point at infinity.
Figure 11B:
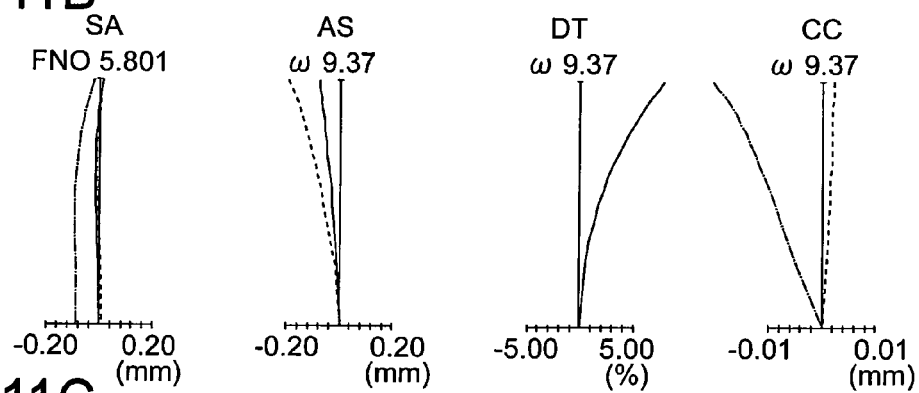
Figure 11C:
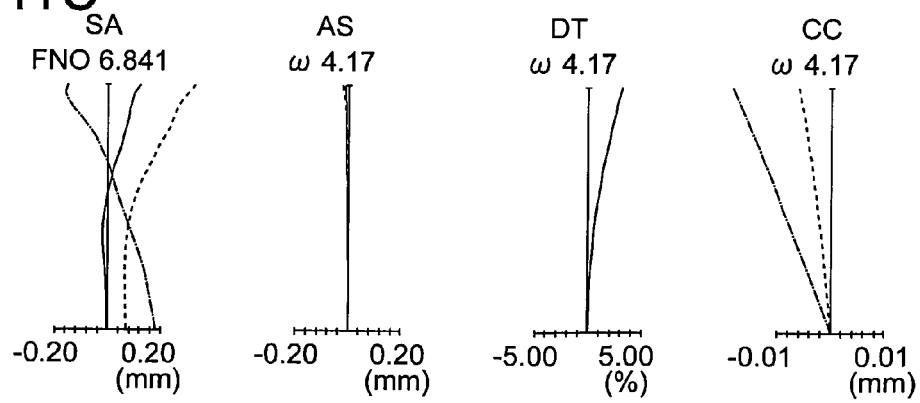
Figure 13A:
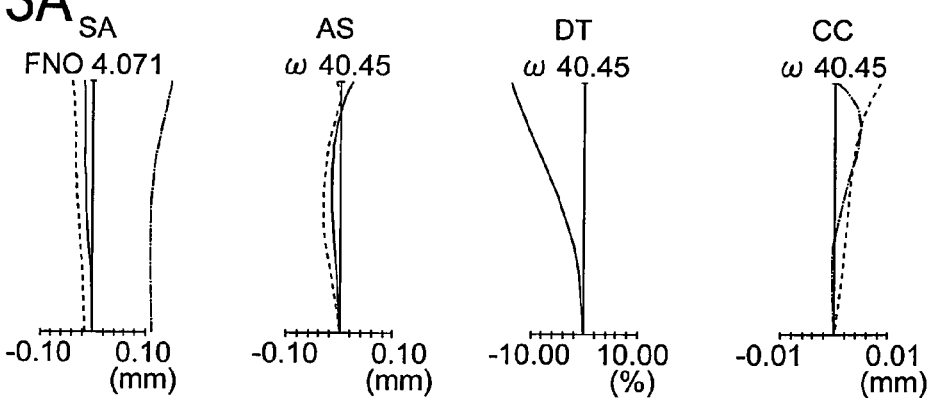
FIGS. 13A, 13B, and 13C show aberrations of the zoom lens according to the sixth embodiment in the state in which the zoom lens is focused on an object point at infinity.
Figure 13B:
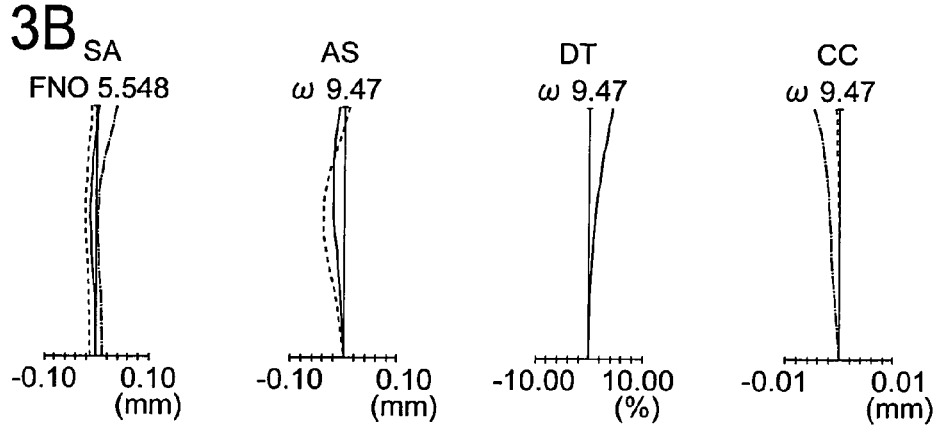
Figure 13C:
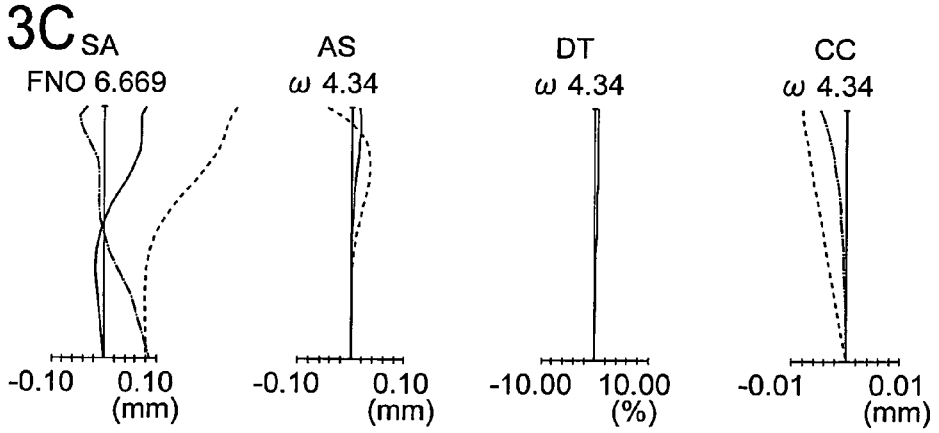
Figure 14A:
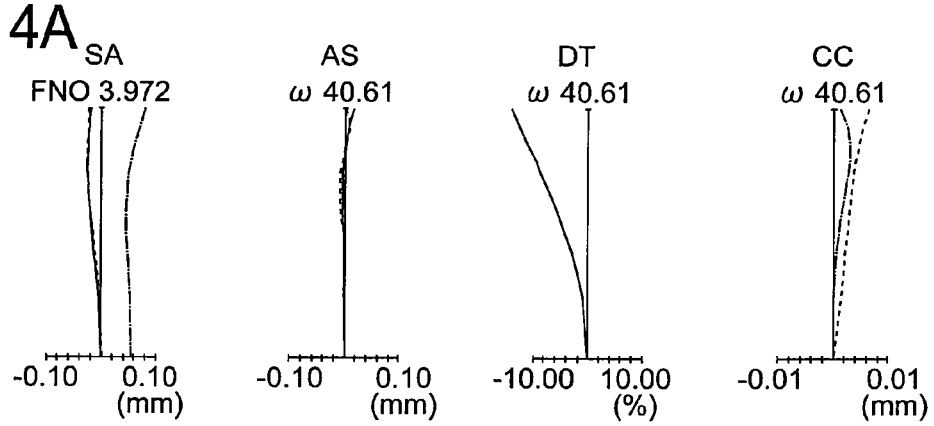
FIGS. 14A, 14B, and 14C show aberrations of the zoom lens according to the seventh embodiment in the state in which the zoom lens is focused on an object point at infinity.
Figure 14B:
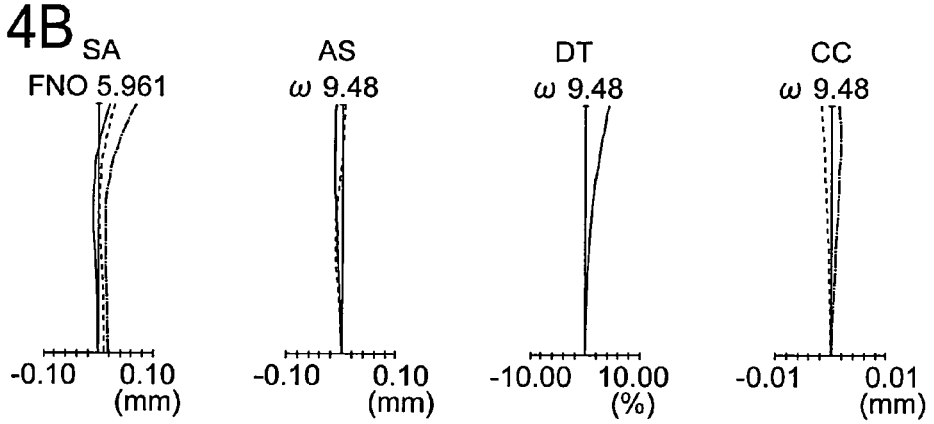
Figure 14C:
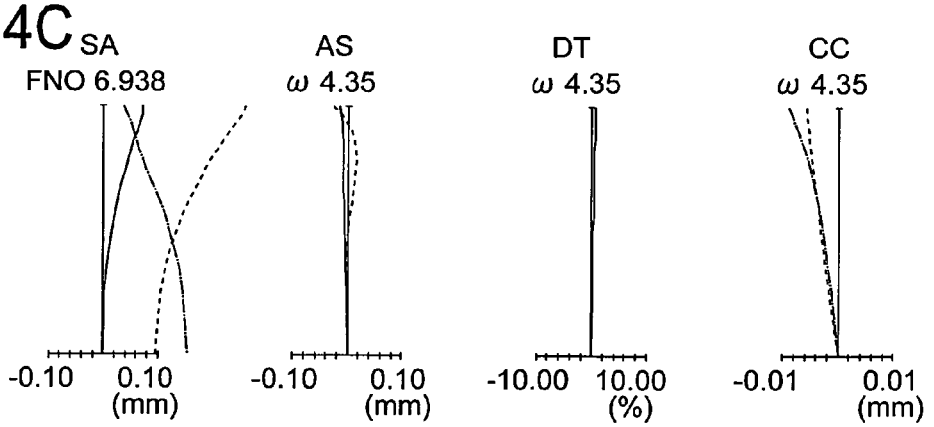

As shown in FIGS. 7A, 7B, and 7C, the zoom lens according to the seventh embodiment includes, in order from its object side, a first lens unit G1 having a positive refracting power, a second lens unit G2 having a negative refracting power, an aperture stop S, a third lens unit G3 having a positive refracting power, a fourth lens unit G4 having a positive refracting power, a fifth lens unit having a negative refracting power, and a sixth lens unit G6 having a positive refracting power.

During zooming from the wide angle end to the telephoto end, the first lens unit G1 is fixed, the second lens unit G2 moves toward the image side, the third lens unit G3 is fixed, the fourth lens unit G4 moves toward the object side, the fifth lens unit G5 moves toward the object side, and the sixth lens unit G6 is fixed.

The first lens unit G1 is composed of a negative meniscus lens having a convex surface directed toward the object side, a prism, a biconvex positive lens, and a biconvex positive lens. The second lens unit G2 is composed of a biconcave negative lens, and a cemented lens made up of a biconcave negative lens and a biconvex positive lens. The third lens unit G3 is composed of a positive meniscus lens having a convex surface directed toward the object side. The fourth lens unit G4 is composed of a cemented lens made up of a biconvex positive lens and a biconvex negative lens, and a biconvex positive lens. The fifth lens unit G5 is composed of a negative meniscus lens having a convex surface directed toward the object side. The sixth lens unit G6 is composed of a biconvex positive lens. The lens elements in each of the lens units are arranged in the mentioned order from the object side.

There are eight aspheric surfaces, which include the image side surface of the negative meniscus lens in the first lens unit G1, both surfaces of the object side biconvex positive lens in the first lens unit G1, both surfaces of the object side biconcave negative lens in the second lens unit G2, the object side surface of the positive meniscus lens in the third lens unit G3, and both surfaces of the image side biconvex positive lens in the fourth lens unit G4.

Numerical data of each embodiment described above is shown below. Apart from symbols described above, BF denotes a back focus, f1, f2, ... denotes a focal length of each lens unit, FNO denotes an F number, w denotes a half image angle, WE denotes a wide angle end, ST denotes an intermediate state, TE denotes a telephoto end, r denotes radius of curvature of each lens surface, d denotes a distance between two lenses, nd denotes a refractive index of each lens for a d-line, and vd denotes an Abbe's number for each lens. The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane.

A shape of the aspheric surface is described by the following expression (I) using each aspherical surface coefficient in each embodiment, when Z is let to be a coordinate point on an optical axis, and Y is let to be a coordinate point on a direction orthogonal to the optical axis.

$$Z=(Y^2/r)/[1+\{1-(K+1)(Y/r)^2\}^{1/2}]+A_4Y^4+A_6Y^6+A_8Y^8+A_{10}Y^{10}+A_{12}Y^{12} \quad (I)$$

where, r denotes a paraxial radius of curvature, K denotes a conical coefficient, $A_4, A_6, A_8, A_{10}$, and $A_{12}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

Example 1

| Unit mm | | | | |
|---|---|---|---|---|
| Surface data | | | | |
| Surface no. | r | d | nd | vd |
| Object plane | ∞ | ∞ | | |
| 1 | 98.092 | 0.50 | 2.00069 | 25.46 |
| 2 | 14.641 | 2.60 | | |
| 3 | ∞ | 12.00 | 1.90366 | 31.32 |
| 4 | ∞ | 0.21 | | |
| 5* | 443.612 | 1.66 | 1.74320 | 49.34 |
| 6* | −24.098 | 0.20 | | |
| 7* | 15.703 | 2.85 | 1.49700 | 81.54 |
| 8 | −38.559 | Variable | | |
| 9* | −8.106 | 0.30 | 1.90200 | 25.10 |
| 10* | 9.383 | 0.50 | | |
| 11 | 15.787 | 2.10 | 1.94595 | 17.98 |
| 12 | −7.628 | 0.30 | 1.88300 | 40.76 |
| 13 | 17.076 | Variable | | |
| 14* | 9.821 | 1.60 | 1.61881 | 63.85 |
| 15* | −85.122 | 0.20 | | |
| 16(stop) | ∞ | Variable | | |
| 17* | 14.967 | 3.17 | 1.49700 | 81.54 |
| 18 | −5.729 | 0.30 | 1.85026 | 32.27 |
| 19 | −9.050 | Variable | | |
| 20 | 38631.547 | 0.30 | 2.00069 | 25.46 |
| 21 | 4.131 | 2.73 | 1.51633 | 64.14 |
| 22 | 2427.864 | 5.51 | | |
| 23 | 191677.874 | 0.30 | 1.78800 | 47.37 |
| 24 | 15.097 | 2.47 | 2.00178 | 19.32 |
| 25 | −15.327 | 0.20 | | |
| 26 | ∞ | 0.50 | 1.54880 | 67.00 |
| 27 | ∞ | 0.50 | | |
| 28 | ∞ | 0.50 | 1.51680 | 64.20 |
| 29 | ∞ | 0.37 | | |
| Image plane | ∞ | | | |

Aspherical surface data

5th surface

K = 0.000
A4 = −2.25479e−08, A6 = 6.41668e−08, A8 = 4.95792e−10

6th surface

K = 0.000
A4 = −5.33163e−06, A6 = −4.27108e−08, A8 = 7.27512e−10

7th surface

K = 0.000
A4 = −1.87524e−05, A6 = −1.73513e−07, A8 = −1.25910e−10

9th surface

K = −0.057
A4 = 8.81519e−04, A6 = 2.11573e−05, A8 = −1.27622e−06

10th surface

K = 0.000
A4 = −1.49369e−04, A6 = 3.61056e−05, A8 = −1.63559e−06

14th surface

K = 1.844
A4 = −4.00279e−04, A6 = −9.91698e−06, A8 = 1.10163e−07

15th surface

K = 3.153
A4 = 2.65249e−05, A6 = −6.76979e−06, A8 = 3.90433e−07

-continued

Unit mm

17th surface

K = −2.246
A4 = −1.89961e−04, A6 = 8.77333e−08, A8 = 2.68828e−07

Zoom data

| | WE | ST | TE |
|---|---|---|---|
| Focal length | 5.14 | 15.64 | 48.86 |
| Fno. | 3.91 | 5.70 | 6.83 |
| Angle of field 2ω | 81.42 | 26.14 | 8.45 |
| Image height | 3.84 | 3.84 | 3.84 |
| BF | 1.72 | 1.72 | 1.72 |
| Lens total length | 68.79 | 68.79 | 68.79 |
| d8 | 1.00 | 9.52 | 15.55 |
| d13 | 15.07 | 6.54 | 0.50 |
| d16 | 7.09 | 3.01 | 2.64 |
| d19 | 4.12 | 8.10 | 8.53 |

Unit focal length f1 = 15.99　　f2 = −5.04　　f3 = 14.32　　f4 = 15.73
f5 = 25.49

Example 2

Unit mm

Surface data

| Surface no. | r | d | nd | vd |
|---|---|---|---|---|
| Object plane | ∞ | ∞ | | |
| 1 | 85.127 | 0.50 | 2.00069 | 25.46 |
| 2 | 14.313 | 2.60 | | |
| 3 | ∞ | 12.00 | 1.90366 | 31.32 |
| 4 | ∞ | 0.21 | | |
| 5* | −225.691 | 1.59 | 1.74320 | 49.34 |
| 6* | −21.762 | 0.20 | | |
| 7* | 14.439 | 2.90 | 1.49700 | 81.54 |
| 8 | −44.212 | Variable | | |
| 9* | −8.110 | 0.30 | 1.90200 | 25.10 |
| 10* | 9.442 | 0.50 | | |
| 11 | 13.990 | 2.16 | 1.94595 | 17.98 |
| 12 | −7.826 | 0.30 | 1.88300 | 40.76 |
| 13 | 14.833 | Variable | | |
| 14* | 10.087 | 1.60 | 1.61881 | 63.85 |
| 15* | −62.720 | 0.20 | | |
| 16(stop) | ∞ | Variable | | |
| 17* | 15.018 | 3.03 | 1.49700 | 81.54 |
| 18 | −5.518 | 0.30 | 1.85026 | 32.27 |
| 19 | −8.771 | Variable | | |
| 20 | −90.962 | 0.30 | 2.00069 | 25.46 |
| 21 | 4.387 | 2.74 | 1.51633 | 64.14 |
| 22 | 55.476 | 5.55 | | |
| 23 | 27.971 | 0.30 | 1.78800 | 47.37 |
| 24 | 13.293 | 2.45 | 2.00178 | 19.32 |
| 25 | −21.675 | 0.20 | | |
| 26 | ∞ | 0.50 | 1.54880 | 67.00 |
| 27 | ∞ | 0.50 | | |
| 28 | ∞ | 0.50 | 1.51680 | 64.20 |
| 29 | ∞ | 0.37 | | |
| Image plane | ∞ | | | |

Aspherical surface data

5th surface

K = 0.000
A4 = 5.06395e−06, A6 = 7.51622e−08,
A8 = 1.38532e−09, A10 = −6.90374e−12

6th surface

K = 0.000
A4 = −6.23781e−06, A6 = −3.50013e−08, A8 = 1.35599e−09,
A10 = −1.27928e−24
7th surface K = 0.000
A4 = −2.62339e−05, A6 = −1.83640e−07,
A8 = 1.11207e−13, A10 = 7.84124e−26
9th surface K = −0.059
A4 = 7.50130e−04, A6 = 1.44278e−05,
A8 = −5.98152e−07, A10 = −9.09258e−26
10th surface K = 0.000
A4 = −2.11408e−04, A6 = 2.12777e−05, A8 = −3.47033e−07,
A10 = −3.68350e−25
14th surface K = 1.852
A4 = −3.47949e−04, A6 = −7.39738e−06,
A8 = 1.51684e−07, A10 = 1.93639e−26
15th surface K = 2.759
A4 = 6.04137e−05, A6 = −4.24405e−06,
A8 = 3.64538e−07, A10 = 2.56493e−26
17th surface K = −2.277
A4 = −1.63104e−04, A6 = 1.89728e−07,
A8 = 3.17801e−07, A10 = −5.84793e−25

Zoom data

| | WE | ST | TE |
|---|---|---|---|
| Focal length | 5.13 | 15.62 | 49.01 |
| Fno. | 3.89 | 5.69 | 6.81 |
| Angle of field 2ω | 81.44 | 26.06 | 8.38 |
| Image height | 3.84 | 3.84 | 3.84 |
| BF | 1.73 | 1.73 | 1.73 |
| Lens total length | 68.68 | 68.68 | 68.68 |
| d8 | 1.00 | 9.50 | 15.56 |
| d13 | 15.05 | 6.54 | 0.50 |
| d16 | 6.98 | 3.23 | 2.60 |
| d19 | 4.20 | 8.11 | 8.56 |

Unit focal length f1 = 16.02　　f2 = −5.02　　f3 = 14.16　　f4 = 15.57
f5 = 20.97

Example 3

Unit mm

Surface data

| Surface no. | r | d | nd | vd |
|---|---|---|---|---|
| Object plane | ∞ | ∞ | | |
| 1 | 107.329 | 0.50 | 2.00069 | 25.46 |
| 2 | 14.826 | 2.60 | | |
| 3 | ∞ | 12.00 | 1.90366 | 31.32 |
| 4 | ∞ | 0.21 | | |
| 5* | −449.056 | 1.55 | 1.74320 | 49.34 |
| 6* | −22.336 | 0.20 | | |
| 7* | 14.704 | 2.87 | 1.49700 | 81.54 |

-continued

Unit mm

| | | | | |
|---|---|---|---|---|
| 8* | −44.795 | Variable | | |
| 9* | −8.069 | 0.30 | 1.90200 | 25.10 |
| 10* | 9.666 | 0.50 | | |
| 11 | 13.977 | 2.16 | 1.94595 | 17.98 |
| 12 | −7.846 | 0.30 | 1.88300 | 40.76 |
| 13 | 14.431 | Variable | | |
| 14* | 10.137 | 1.59 | 1.61881 | 63.85 |
| 15* | −55.149 | 0.20 | | |
| 16(stop) | ∞ | Variable | | |
| 17* | 13.351 | 3.35 | 1.49700 | 81.54 |
| 18 | −5.277 | 0.30 | 1.85026 | 32.27 |
| 19 | −8.601 | Variable | | |
| 20 | −130.342 | 0.30 | 2.00069 | 25.46 |
| 21 | 3.992 | 2.56 | 1.51633 | 64.14 |
| 22 | 16.428 | 5.20 | | |
| 23 | 19.267 | 0.30 | 1.78800 | 47.37 |
| 24 | 9.139 | 3.15 | 2.00069 | 25.46 |
| 25 | −19.671 | 0.20 | | |
| 26 | ∞ | 0.50 | 1.54880 | 67.00 |
| 27 | ∞ | 0.50 | | |
| 28 | ∞ | 0.50 | 1.51680 | 64.20 |
| 29 | ∞ | 0.37 | | |
| Image plane | ∞ | | | |

Aspherical surface data

5th surface

K = 0.000
A4 = 5.04644e−06, A6 = 6.41121e−08, A8 = 1.46460e−09,
A10 = 4.38213e−11

6th surface

K = 0.000
A4 = −4.03123e−06, A6 = −3.70975e−08, A8 = 7.18165e−10,
A10 = 5.94905e−11

7th surface

K = 0.000
A4 = −2.30009e−05, A6 = −1.89066e−07, A8 = −2.83481e−12

9th surface

K = −1.391
A4 = 6.24893e−04, A6 = −8.62204e−06, A8 = 5.61043e−07

10th surface

K = 0.000
A4 = −1.13346e−06, A6 = −6.89849e−06, A8 = 1.62345e−06

14th surface

K = 1.954
A4 = −4.17674e−04, A6 = −9.55420e−06, A8 = 2.86015e−07

15th surface

K = 20.082
A4 = 5.90407e−06, A6 = −6.36510e−06, A8 = 5.36924e−07

17th surface

K = 0.570
A4 = −2.75049e−04, A6 = 2.77954e−06, A8 = 3.64844e−07

Zoom data

| | WE | ST | TE |
|---|---|---|---|
| Focal length | 5.12 | 15.41 | 48.95 |
| Fno. | 3.90 | 5.98 | 6.80 |
| Angle of field 2ω | 81.45 | 26.28 | 8.35 |
| Image height | 3.84 | 3.84 | 3.84 |
| BF | 1.73 | 1.73 | 1.73 |
| Lens total length | 68.68 | 68.68 | 68.68 |
| d8 | 1.00 | 9.49 | 15.61 |
| d13 | 15.11 | 6.61 | 0.50 |
| d16 | 6.74 | 3.21 | 2.61 |
| d19 | 3.97 | 7.59 | 8.14 |

-continued

Unit mm

Unit focal length

| f1 = 16.11 | f2 = −5.02 | f3 = 13.97 | f4 = 14.96 | f5 = 13.04 |
|---|---|---|---|---|

Example 4

Unit mm

Surface data

| Surface no. | r | d | nd | vd |
|---|---|---|---|---|
| Object plane | ∞ | ∞ | | |
| 1 | 99.518 | 0.60 | 1.84666 | 23.78 |
| 2* | 11.428 | 2.70 | | |
| 3 | ∞ | 11.97 | 1.84666 | 23.78 |
| 4 | ∞ | 0.20 | | |
| 5* | 19.605 | 3.00 | 1.49700 | 81.54 |
| 6* | −15.158 | 0.20 | | |
| 7 | 38.855 | 2.30 | 1.72916 | 54.68 |
| 8 | −38.503 | Variable | | |
| 9* | −13.098 | 0.40 | 1.80139 | 45.45 |
| 10* | 6.964 | 1.48 | | |
| 11 | −14.105 | 0.50 | 2.01820 | 28.03 |
| 12 | 9.045 | 1.72 | 1.94362 | 17.55 |
| 13 | −14.750 | Variable | | |
| 14(stop) | ∞ | 0.90 | | |
| 15* | 6.851 | 1.45 | 1.49700 | 81.54 |
| 16 | 15.699 | Variable | | |
| 17 | 125.536 | 3.83 | 1.49700 | 81.54 |
| 18 | −9.420 | 0.50 | 1.99165 | 26.93 |
| 19 | −40.393 | 0.20 | | |
| 20* | 21.383 | 2.60 | 1.53180 | 56.00 |
| 21* | −7.973 | Variable | | |
| 22 | 14.105 | 1.10 | 1.90259 | 32.50 |
| 23 | 5.168 | Variable | | |
| 24 | 11.884 | 2.83 | 1.49700 | 81.60 |
| 25 | −11.931 | 0.15 | | |
| 26 | ∞ | 0.42 | 1.54880 | 67.00 |
| 27 | ∞ | 0.50 | | |
| 28 | ∞ | 0.50 | 1.51633 | 64.10 |
| Image plane | ∞ | | | |

Aspherical surface data

2nd surface

K = −4.467
A4 = 4.03959e−04, A6 = −1.70441e−06, A8 = 1.72129e−08

5th surface

K = −3.000
A4 = −8.21321e−05, A6 = 9.69689e−07, A8 = −1.25272e−08

6th surface

K = 1.464
A4 = 3.35955e−05, A6 = 9.19573e−07, A8 = −4.97736e−09

9th surface

K = 0.000
A4 = 2.86004e−04

10th surface

K = 0.000
A4 = −7.24011e−04, A6 = 3.64235e−06

15th surface

K = 0.000
A4 = −3.34590e−04, A6 = −4.78611e−06

-continued

Unit mm

20th surface

K = 0.000
A4 = −4.11171e−04
21st surface

K = 0.000
A4 = 2.42732e−04

Zoom data

|  | WE | ST | TE |
|---|---|---|---|
| Focal length | 4.52 | 20.66 | 47.51 |
| Fno. | 4.19 | 5.80 | 6.84 |
| Angle of field 2ω | 86.13 | 18.74 | 8.33 |
| Image height | 3.59 | 3.59 | 3.59 |
| BF | 1.25 | 1.25 | 1.25 |
| Lens total length | 69.31 | 69.31 | 69.31 |
| d8 | 0.50 | 8.37 | 11.51 |
| d13 | 12.01 | 4.14 | 1.00 |
| d16 | 4.36 | 0.35 | 1.80 |
| d21 | 9.56 | 9.04 | 1.98 |
| d23 | 3.13 | 7.67 | 13.28 |

Unit focal length

| f1 = 11.03 | f2 = −5.58 | f3 = 23.20 | f4 = 14.58 |
|---|---|---|---|
| f5 = −9.60 | f6 = 12.47 | | |

Example 5

Unit mm

Surface data

| Surface no. | r | d | nd | vd |
|---|---|---|---|---|
| Object plane | ∞ | ∞ | | |
| 1 | 106.398 | 0.60 | 1.84666 | 23.78 |
| 2* | 11.375 | 2.73 | | |
| 3 | ∞ | 11.97 | 1.84666 | 23.78 |
| 4 | ∞ | 0.20 | | |
| 5* | 17.538 | 3.10 | 1.49700 | 81.54 |
| 6* | −16.212 | 0.20 | | |
| 7 | 54.024 | 2.20 | 1.72916 | 54.68 |
| 8 | −31.666 | Variable | | |
| 9* | −15.838 | 0.40 | 1.76802 | 49.24 |
| 10* | 6.324 | 1.30 | | |
| 11 | −44.612 | 0.50 | 1.88300 | 40.76 |
| 12 | 9.045 | 1.72 | 1.94595 | 17.98 |
| 13 | −253.761 | Variable | | |
| 14(stop) | ∞ | 0.60 | | |
| 15* | 8.848 | 1.45 | 1.58313 | 59.38 |
| 16 | 20.952 | Variable | | |
| 17 | 17.087 | 2.92 | 1.49700 | 81.54 |
| 18 | −9.420 | 0.50 | 1.90366 | 31.32 |
| 19 | 45.271 | 0.20 | | |
| 20* | 15.563 | 2.60 | 1.53180 | 56.00 |
| 21* | −7.160 | Variable | | |
| 22 | 24.424 | 1.10 | 1.90259 | 32.50 |
| 23 | 6.259 | Variable | | |
| 24 | 10.011 | 2.83 | 1.53071 | 55.60 |
| 25 | −21.389 | 0.15 | | |
| 26 | ∞ | 0.42 | 1.54880 | 67.00 |
| 27 | ∞ | 0.50 | | |
| 28 | ∞ | 0.50 | 1.51633 | 64.10 |
| Image plane | ∞ | | | |

-continued

Unit mm

Aspherical surface data

2nd surface

K = −4.467
A4 = 3.98813e−04, A6 = −1.95950e−06, A8 = 2.03574e−08
5th surface

K = −3.000
A4 = −6.56079e−05, A6 = 2.46571e−07, A8 = −1.38942e−09
6th surface

K = 0.972
A4 = 2.46615e−05, A6 = 1.53622e−07, A8 = 2.91381e−10
9th surface

K = 0.000
A4 = 3.25830e−05
10th surface

K = 0.000
A4 = −7.11565e−04, A6 = −1.51397e−05
15th surface

K = 0.000
A4 = −1.68543e−04, A6 = −5.03020e−06
20th surface

K = 0.000
A4 = −4.30833e−04
21st surface

K = 0.000
A4 = 3.32580e−04

Zoom data

|  | WE | ST | TE |
|---|---|---|---|
| Focal length | 4.51 | 20.64 | 47.47 |
| Fno. | 4.06 | 6.43 | 6.91 |
| Angle of field 2ω | 87.46 | 18.74 | 8.24 |
| Image height | 3.59 | 3.59 | 3.59 |
| BF | 1.28 | 1.28 | 1.28 |
| Lens total length | 68.79 | 68.79 | 68.79 |
| d8 | 0.50 | 8.06 | 11.51 |
| d13 | 12.01 | 4.45 | 1.00 |
| d16 | 5.57 | 0.72 | 1.81 |
| d21 | 9.20 | 9.11 | 2.00 |
| d23 | 3.10 | 8.05 | 14.08 |

Unit focal length

| f1 = 11.16 | f2 = −5.51 | f3 = 25.16 | f4 = 13.79 |
|---|---|---|---|
| f5 = −9.60 | f6 = 13.26 | | |

Example 6

Unit mm

Surface data

| Surface no. | r | d | nd | vd |
|---|---|---|---|---|
| Object plane | ∞ | ∞ | | |
| 1 | 95.870 | 0.60 | 1.84666 | 23.78 |
| 2* | 11.718 | 2.70 | | |
| 3 | ∞ | 11.97 | 1.84666 | 23.78 |
| 4 | ∞ | 0.20 | | |
| 5* | 24.671 | 3.00 | 1.49700 | 81.54 |
| 6* | −13.769 | 0.20 | | |
| 7 | 24.896 | 2.30 | 1.72916 | 54.68 |

-continued

Unit mm

| | | | | |
|---|---|---|---|---|
| 8* | −58.694 | Variable | | |
| 9* | −62.598 | 0.40 | 1.80139 | 45.45 |
| 10* | 6.068 | 1.48 | | |
| 11 | −8.720 | 0.50 | 2.02000 | 28.00 |
| 12 | 9.045 | 1.72 | 1.95288 | 17.45 |
| 13 | −13.268 | Variable | | |
| 14(stop) | ∞ | 0.90 | | |
| 15* | 6.302 | 1.45 | 1.49700 | 81.54 |
| 16 | 13.705 | Variable | | |
| 17 | 91.032 | 3.83 | 1.49700 | 81.54 |
| 18 | −9.420 | 0.50 | 1.99165 | 26.93 |
| 19 | −48.897 | 0.20 | | |
| 20* | 20.939 | 2.60 | 1.53180 | 56.00 |
| 21* | −7.664 | Variable | | |
| 22 | 12.911 | 1.10 | 1.90259 | 32.50 |
| 23 | 4.975 | Variable | | |
| 24 | 24.904 | 2.83 | 1.49700 | 81.60 |
| 25 | −9.349 | 0.15 | | |
| 26 | ∞ | 0.42 | 1.54880 | 67.00 |
| 27 | ∞ | 0.50 | | |
| 28 | ∞ | 0.50 | 1.51633 | 64.10 |
| Image plane | ∞ | | | |

Aspherical surface data

2nd surface

K = −4.467
A4 = 4.11404e−04, A6 = −9.95647e−07, A8 = 1.89726e−08
5th surface

K = −3.000
A4 = −9.32001e−05, A6 = 7.68664e−07, A8 = −6.42927e−09
6th surface

K = 0.720
A4 = 5.61993e−06, A6 = 5.31953e−07, A8 = −2.22711e−09
9th surface

K = 0.000
A4 = −2.40110e−04
10th surface

K = 0.000
A4 = −7.72857e−04, A6 = −2.31059e−05
15th surface

K = 0.000
A4 = −4.20856e−04−7.81582e−06
20th surface

K = 0.000
A4 = −5.03001e−04
21st surface

K = 0.000
A4 = 2.36467e−04

Zoom data

| | WE | ST | TE |
|---|---|---|---|
| Focal length | 4.88 | 20.61 | 46.95 |
| Fno. | 4.07 | 5.55 | 6.67 |
| Angle of field 2ω | 80.91 | 18.95 | 8.69 |
| Image height | 3.59 | 3.59 | 3.59 |
| BF | 1.60 | 1.60 | 1.60 |
| Lens total length | 67.56 | 67.56 | 67.56 |
| d8 | 0.50 | 7.41 | 10.17 |
| d13 | 10.67 | 3.76 | 1.00 |
| d16 | 4.28 | 1.10 | 1.00 |
| d21 | 10.04 | 9.04 | 1.90 |
| d23 | 1.98 | 6.17 | 13.41 |

-continued

Unit mm

Unit focal length

| | | | |
|---|---|---|---|
| f1 = 10.43 | f2 = −5.38 | f3 = 22.04 | f4 = 14.48 |
| f5 = −9.60 | f6 = 14.06 | | |

Example 7

Unit mm

Surface data

| Surface no. | r | d | nd | vd |
|---|---|---|---|---|
| Object plane | ∞ | ∞ | | |
| 1 | 85.461 | 0.60 | 1.84666 | 23.78 |
| 2* | 11.377 | 2.73 | | |
| 3 | ∞ | 11.97 | 1.84666 | 23.78 |
| 4 | ∞ | 0.20 | | |
| 5* | 23.539 | 3.10 | 1.49700 | 81.54 |
| 6* | −13.680 | 0.20 | | |
| 7 | 31.645 | 2.20 | 1.72916 | 54.68 |
| 8 | −43.456 | Variable | | |
| 9* | −36.322 | 0.40 | 1.76802 | 49.24 |
| 10* | 6.213 | 1.30 | | |
| 11 | −19.855 | 0.50 | 1.88300 | 40.76 |
| 12 | 9.045 | 1.72 | 1.94595 | 17.98 |
| 13 | −1052.890 | Variable | | |
| 14(stop) | ∞ | 0.60 | | |
| 15* | 6.699 | 1.45 | 1.58313 | 59.38 |
| 16 | 13.095 | Variable | | |
| 17 | 17.970 | 2.92 | 1.49700 | 81.54 |
| 18 | −9.420 | 0.50 | 1.90366 | 31.32 |
| 19 | 52.493 | 0.20 | | |
| 20* | 13.725 | 2.60 | 1.53180 | 56.00 |
| 21* | −7.699 | Variable | | |
| 22 | 15.744 | 1.10 | 1.90259 | 32.50 |
| 23 | 5.403 | Variable | | |
| 24 | 23.086 | 2.83 | 1.53071 | 55.60 |
| 25 | −10.770 | 0.15 | | |
| 26 | ∞ | 0.42 | 1.54880 | 67.00 |
| 27 | ∞ | 0.50 | | |
| 28 | ∞ | 0.50 | 1.51633 | 64.10 |
| Image plane | ∞ | | | |

Aspherical surface data

2nd surface

K = −4.467
A4 = 4.63633e−04, A6 = −2.40019e−06, A8 = 4.27689e−08
5th surface

K = −3.000
A4 = −5.57686e−05, A6 = −1.56344e−07, A8 = 1.37614e−09
6th surface

K = 0.517
A4 = 3.47119e−05, A6 = −1.50986e−07, A8 = 1.60228e−09
9th surface

K = 0.000
A4 = −4.30015e−05
10th surface

K = 0.000
A4 = −4.53587e−04, A6 = −1.31203e−05
15th surface

K = 0.000
A4 = −3.52390e−04, A6 = −5.03020e−06

-continued

| Unit mm |
| --- |

20th surface

K = 0.000
A4 = −3.84608e−04

21st surface

K = 0.000
A4 = 4.08696e−04

| Zoom data | | | |
| --- | --- | --- | --- |
|  | WE | ST | TE |
| Focal length | 4.87 | 20.61 | 46.98 |
| Fno. | 3.97 | 5.96 | 6.94 |
| Angle of field 2ω | 81.22 | 18.96 | 8.70 |
| Image height | 3.59 | 3.59 | 3.59 |
| BF | 1.63 | 1.63 | 1.63 |
| Lens total length | 67.59 | 67.59 | 67.59 |
| d8 | 0.50 | 7.36 | 10.10 |
| d13 | 10.60 | 3.75 | 1.00 |
| d16 | 6.73 | 2.95 | 1.00 |
| d21 | 9.00 | 8.48 | 1.90 |
| d23 | 2.00 | 6.30 | 14.83 |

| Unit focal length | | | |
| --- | --- | --- | --- |
| f1 = 10.57 | f2 = −5.31 | f3 = 21.70 | f4 = 13.77 |
| f5 = −9.60 | f6 = 14.25 | | |

Aberration diagrams at the time of the infinite object point focusing of the first to seventh embodiments are shown in FIG. 8A to FIG. 14C, respectively. In these aberration diagrams, FIG. 8A, FIG. 9A, FIG. 10A, FIG. 11A, FIG. 12A, FIG. 13A, and FIG. 14A show a spherical aberration (SA), an astigmatism (AS), a distortion (DT), and a chromatic aberration of magnification (CC) respectively, at the wide angle end, FIG. 8B, FIG. 9B, FIG. 10B, FIG. 11B, FIG. 12B, FIG. 13B, and FIG. 14B shows a spherical aberration, an astigmatism, a distortion, and a chromatic aberration of magnification respectively, at the intermediate focal length state, and FIG. 8C, FIG. 9C, FIG. 10C, FIG. 11C, FIG. 12C, FIG. 13C, and FIG. 14C show a spherical aberration, an astigmatism, a distortion, and a chromatic aberration of magnification at the telephoto end. In each diagram, 'ω' shows a half image angle.

Next, parameter and values of conditional expressions in each embodiments are described.

|  | Example 1 | Example 2 | Example 3 | Example 4 |
| --- | --- | --- | --- | --- |
| (1) $f_T/f_W$ | 9.51 | 9.56 | 9.55 | 10.51 |
| (2) $f_W/I_H$ | 1.34 | 1.34 | 1.33 | 1.26 |
| (3) $|v_{dp1} - v_{dp2}|$ | 32.20 | 32.20 | 32.20 | 26.86 |
| (4), (4A) $\Delta_{2G}/f_W$ | 2.83 | 2.84 | 2.84 | 2.43 |
| (5A) $vd_{pone}$ | 81.54 | 81.54 | 81.54 | 81.54 |
| (5B) $vd_{poth}$ | 49.34 | 49.34 | 49.34 | 54.68 |
| (6) $f_{4G}/f_T$ | 0.32 | 0.32 | 0.31 | 0.31 |
| (7) $f_{RG}/f_T$ | 0.52 | 0.43 | 0.27 | 0.26 |
| (A) $n_{dp1} - n_{dp2}$ | 0.25 | 0.25 | 0.25 | 0.23 |
| (AA) $f_{2G}/f_T$ | −0.10 | −0.10 | −0.10 | −0.12 |
| (B) $N_{dn1}$ | 1.90 | 1.90 | 1.90 | 1.80 |
| (C) $SF_{2G}$ | 3.44 | 4.50 | 5.06 | 7.69 |
| (D) $L_T/f_T$ | 1.36 | 1.35 | 1.35 | 1.43 |
| (E) $\Delta_{2G}/f_T$ | 0.30 | 0.30 | 0.30 | 0.23 |
| (F) $\Sigma_{2G}/f_W$ | 0.62 | 0.64 | 0.64 | 0.91 |
|  | Example 5 | Example 6 | Example 7 |  |
| (1) $f_T/f_W$ | 10.51 | 9.61 | 9.64 |  |
| (2) $f_W/I_H$ | 1.26 | 1.36 | 1.36 |  |
| (3) $|v_{dp1} - v_{dp2}|$ | 26.86 | 26.86 | 26.86 |  |
| (4), (4A) $\Delta_{2G}/f_W$ | 2.44 | 1.98 | 1.97 |  |
| (5A) $v_{dpone}$ | 81.54 | 81.54 | 81.54 |  |
| (5B) $v_{dpoth}$ | 54.68 | 54.68 | 54.68 |  |
| (6) $f_{4G}/f_T$ | 0.29 | 0.31 | 0.29 |  |
| (7) $f_{RG}/f_T$ | 0.28 | 0.30 | 0.30 |  |
| (A) $n_{dp1} - n_{dp2}$ | 0.23 | 0.23 | 0.23 |  |
| (AA) f2G/fT | −0.12 | −0.11 | −0.11 |  |
| (B) $N_{dn1}$ | 1.77 | 1.80 | 1.77 |  |
| (C) $SF_{2G}$ | 5.65 | 5.08 | 5.39 |  |
| (D) $L_T/f_T$ | 1.42 | 1.41 | 1.41 |  |
| (E) $\Delta_{2G}/f_T$ | 0.23 | 0.21 | 0.20 |  |
| (F) $\Sigma_{2G}/f_W$ | 0.87 | 0.84 | 0.80 |  |

(Correction of Distortion)

Incidentally, when the zoom lens system of the present invention is used, a digital correction of distortion of an image may be carried out electrically. A basic concept for the digital correction of the distortion of an image will be described below.

For example, the image heights in the wide angled end can be set to the following values when the correction of distortion is carried out. Moreover, the image heights in the intermediate state and the telephoto end can be set to that shown in each example described above.

Further, the image heights in the wide angled end on condition that the correction of distortion is carried out are shown below. These are examples in which, when the distortion is corrected electrically, the remained distortion is corrected so as to be −3% on the basis of the shorter side.

The effective image pickup area in the wide angled area has a barrel-shape, and the effective image pickup area is corrected to a rectangle shape by image processing.

In the intermediate state and the telephoto end, the distortion having a bobbin-shape is corrected electrically so that the remained distortion is set to be 0%.

|  | WE | ST | TE |
| --- | --- | --- | --- |
| Example 1 | 3.62 | 3.84 | 3.84 |
| Example 2 | 3.62 | 3.84 | 3.84 |
| Example 3 | 3.62 | 3.84 | 3.84 |
| Example 4 | 3.35 | 3.59 | 3.59 |
| Example 5 | 3.37 | 3.59 | 3.59 |
| Example 6 | 3.36 | 3.59 | 3.59 |
| Example 7 | 3.36 | 3.59 | 3.59 |

Figure 15:
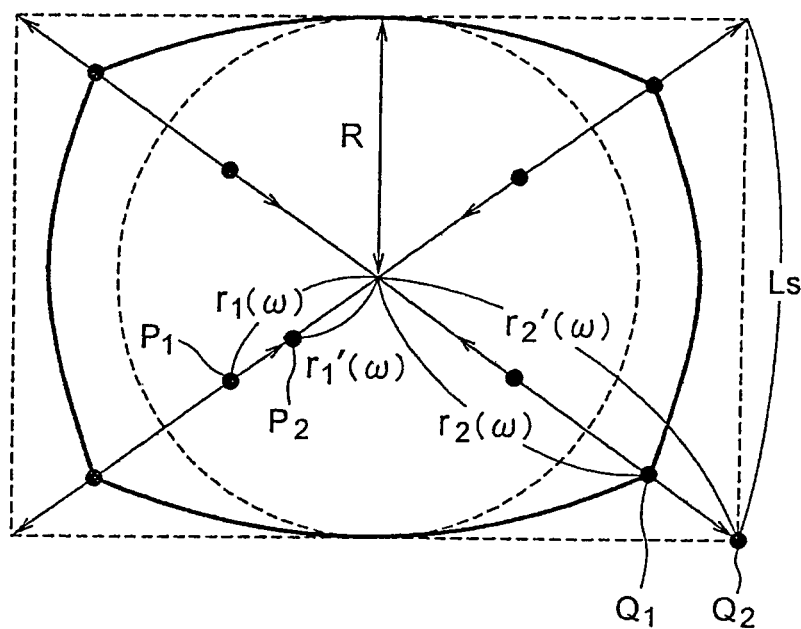
FIG. 15 illustrates correction of distortion.

For example, as shown in FIG. 15, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius r(ω) other than the radius R is moved in a substantial direction of radiation, and the correction is carried out by moving on a concentric circle such that the radius becomes r'(ω).

For example, in FIG. 15, a point $P_1$ on a circumference of an arbitrary radius $r_1(ω)$ positioned at an inner side of a circle of radius R is moved to a point $P_2$ on a circumference of a radius $r_1'(ω)$ which is to be corrected, directed toward a center of the circle. Moreover, a point $Q_1$ on a circumference of an arbitrary radius $r_2(ω)$ positioned at an outer side of the circle of radius R is moved to a point $Q_2$ on a circumference of a radius $r_2'(\omega)$ which is to be corrected, directed toward a direction away from the center of the circle.

Here, $r'(\omega)$ can be expressed as follows.

$$r'(\omega)=\alpha\cdot f\cdot\tan\omega(0\leq\alpha\leq1)$$

where, $\omega$ is a half image angle of an object and f is a focal length of an imaging optical system (the zoom lens system in the present invention).

Here, when an ideal image height corresponding to a circle (image height) of radius R is let to be Y, then $$\alpha=R/Y=R/(f\cdot\tan\omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius $r(\omega)$ other than the radius R in a substantial direction of radiation, and moving on a concentric circle such that the radius becomes $r'(\omega)$, it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount $r'(\omega)-r(\omega)$, an arrangement may be made such that a relationship between $r(\omega)$, in other words, half image angle and the image height, or a relationship between a real image height r and an ideal image height $r'/\alpha$ is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0\leq R\leq0.6Ls$$

where, Ls is a length of a short side of the effective image pickup surface.

It is preferable that the radius R satisfies the following conditional expression.

$$0.3Ls\leq R\leq0.6Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega)=\alpha\cdot f\cdot\tan\omega$$

near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega)=\alpha\cdot f\cdot\tan\omega$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f=y/\tan\omega$$

holds.

Here, y denotes a height (image height) of an image point from the optical axis, f denotes a focal length of an imaging system (zoom lens system in the present invention), and $\omega$ denotes an angle (object half image angle) with respect to the optical axis in an object point direction corresponding to image points connecting from a center on an image pickup plane up to a position of y.

When there is a barrel-shape distortion in the imaging system, the relationship becomes $$f>y/\tan\omega.$$

In other words, when the focal length f of the imaging system, and the image height y are let to be fixed, a value of $\omega$ becomes large.

(Digital Camera)

Further, the present invention could be applied to an electrical image pick up apparatus, especially a digital camera, video camera etc. in which the object image is formed by the above-mentioned zoom lens, then the object image is light-received such as CCD etc. Such embodiment will be described below.

Figure 16:
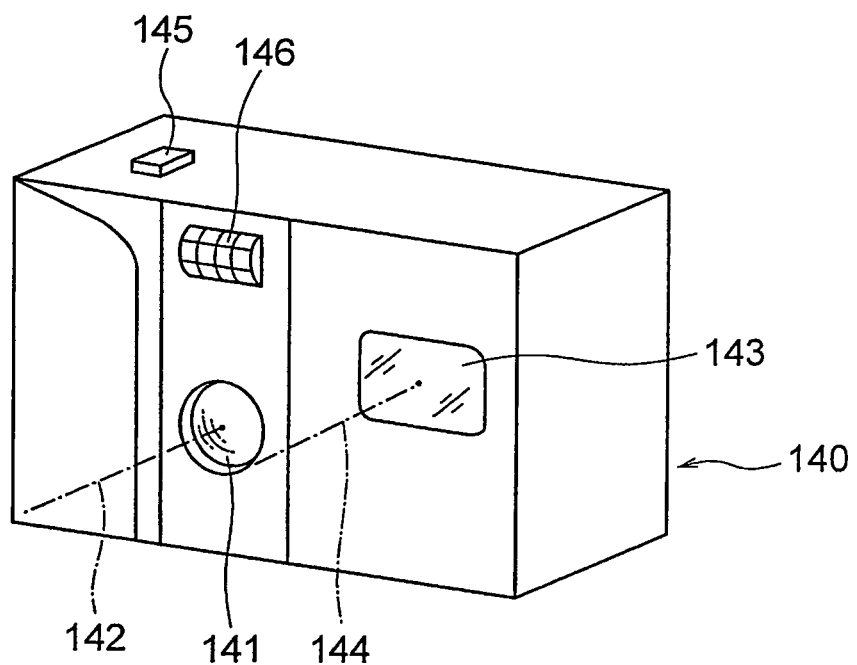
FIG. 16 is a front perspective view showing the outer appearance of a digital camera equipped with a zoom lens having a bent optical path according to the present invention.
Figure 17:
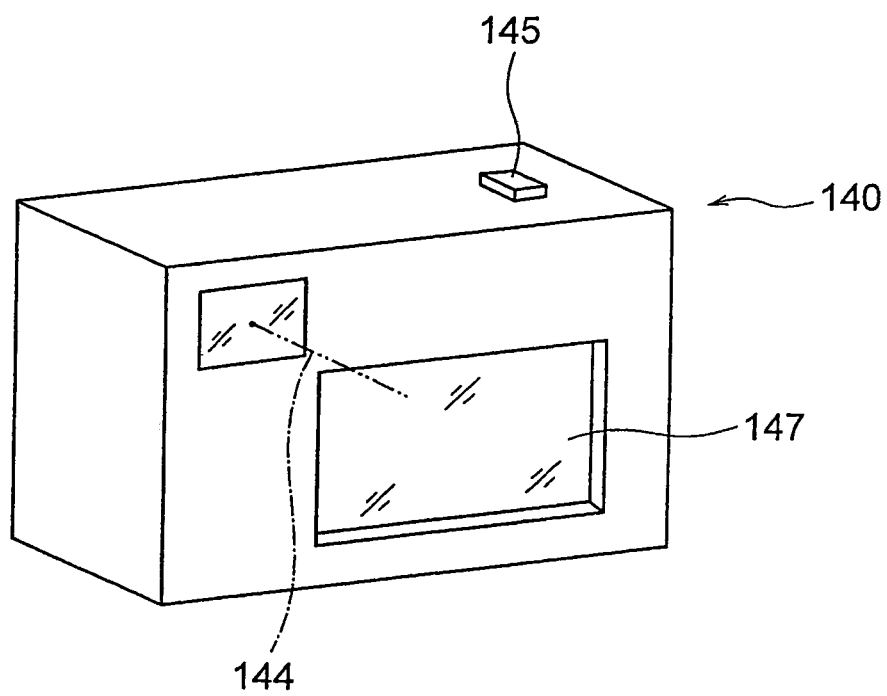
FIG. 17 is a rear perspective view of the digital camera.

FIG. 16 to FIG. 18 are conceptual diagrams of a structure of a digital camera according to the present invention in which a zoom lens system described above is incorporated in a taking optical system 141. FIG. 16 is a front perspective view showing an appearance of a digital camera 140, FIG. 17 is a rear perspective view of the same, and FIG. 18 is a schematic cross-sectional view showing a structure of the digital camera 140. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., when the shutter button 145 disposed on an upper portion of the digital camera 140 is pressed, in synchronization with the pressing of the shutter button 145, a photograph is taken by the taking optical system 141 such as the optical path reflecting zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. An object image formed by the finder objective optical system 153 is formed on a field frame 157 of a Porro prism 155 which is an image erecting member. On a rear side of the Porro prism 155, an eyepiece optical system 159 which guides an erected image to a viewer's eyeball, is disposed. A cover member 150 is disposed on an emergence side of the eyepiece optical system 159.

Since, in the digital camera 140 structured in such manner, the taking optical system 141 has a high zoom ratio of 3.5 magnifications and the zoom lens has a high optical performance, it is possible to realize the high-performance inexpensive digital camera in which the depth is extremely thin.

Further, the example shown in FIG. 18, a plane parallel plate is disposed as the cover member 150. However, a lens having a power could be used. Furthermore, the cover member 150 could be omitted.

(Internal Circuit Structure)

FIG. 19 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 19, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The taking optical system 141 of the above-described digital camera 140 has a high zoom ratio and excellently stable imaging performance throughout the entire zoom range while achieving a satisfactorily wide angle range and compact construction according to the present invention. Thus, high performance, size reduction and wide angle of view can be achieved in the digital camera. Moreover, quick focusing can be achieved in both the wide angle and telephoto zoom ranges.

As described in the foregoing, the present invention can suitably applied to an image pickup apparatus equipped with a zoom lens having a reflecting member that deflects optical path to reduce the thickness of the apparatus.

What is claimed is:

1. An image pickup apparatus comprising:
a zoom lens; and
an image pickup element having an image pickup surface for converting an image formed by the zoom lens into an electrical signal, wherein
the zoom lens comprises, in order from the object side to the image side, a first lens unit having a positive refracting power including a reflecting member having a reflecting surface that deflects the optical path, a second lens unit having a negative refracting power, and a rear lens unit group having a positive refracting power as a whole and comprising, in order from the object side, a third lens unit, a fourth lens unit, and a fifth lens unit,
the zoom lens comprises an aperture stop disposed between the second lens unit and the fourth lens unit,
during zooming from the wide angle end to the telephoto end, the first lens unit is kept stationary, the second lens unit moves in such a way that it is located closer to the image side at the telephoto end than at the wide angle end, and the distances between the lens units change,
the first lens unit comprises, in order from the object side to the image side, a negative lens component, the reflecting member, and a rear sub-lens unit comprising a first positive lens element and a second positive lens element, and
the following conditional expressions (1), (2), and (3) are satisfied:

$$7 < f_T/f_W < 30 \quad (1),$$

$$0.5 < f_W/IH < 1.38 \quad (2),$$

and $$16.5 < |v_{dp1} - v_{dp2}| < 80 \quad (3),$$

where $f_T$ is the focal length of the entire zoom lens system at the telephoto end, $f_w$ is the focal length of the entire zoom lens system at the wide angle end, IH is the highest image height in an effective image pickup area on the image pickup surface, $v_{dp1}$ is the Abbe constant of the first positive lens element in the first lens unit with respect to the d-line, $v_{dp2}$ is the Abbe constant of the second positive lens element in the first lens unit with respect to the d-line, the term "lens component" refers to a lens member composed of a single lens element or a cemented lens component delimited by effective lens surfaces that are in contact with air, and the Abbe constant is defined as $(n_{d1}-1)/(n_{F1}-n_{C1})$ with $n_{d1}$, $n_{C1}$, and $n_{F1}$ being the refractive indices of the first or second positive lens element with respect to the d-line, the C-line, and the F-line respectively.

2. An image pickup apparatus comprising:
a zoom lens; and
an image pickup element having an image pickup surface for converting an image formed by the zoom lens into an electrical signal, wherein
the zoom lens comprises, in order from the object side to the image side, a first lens unit having a positive refracting power comprising a reflecting member having a reflecting surface that deflects the optical path, a second lens unit having a negative refracting power, and a rear lens unit group having a positive refracting power as a whole and comprising, in order from the object side, a third lens unit, a fourth lens unit, and a fifth lens unit,
the zoom lens comprises an aperture stop disposed between the second lens unit and the fourth lens unit,
during zooming from the wide angle end to the telephoto end, the first lens unit is kept stationary, the second lens unit moves in such a way that it is located closer to the image side at the telephoto end than at the wide angle end, and the distances between the lens units change,
the first lens unit comprises, in order from the object side to the image side, a negative lens component, the reflecting member, and a rear sub-lens unit comprising a first positive lens element and a second positive lens element,
the rear lens unit group comprises at least three lens units each having a positive refracting power,
the following conditional expressions (3) and (4) are satisfied:

$$16.5 < |v_{dp1} - v_{dp2}| < 80 \quad (3),$$

and $$2.35 < |\Delta_{2G}/f_W| < 15 \quad (4),$$

where $v_{dp1}$ is the Abbe constant of the first positive lens element in the first lens unit with respect to the d-line, $v_{dp2}$ is the Abbe constant of the second positive lens element in the first lens unit with respect to the d-line, $\Delta_{2G}$ is the displacement of the position of the second lens unit at the telephoto end from the position of the second lens unit at the wide angle end with a displacement toward the image side being represented by a positive value, and $f_w$ is the focal length of the zoom lens at the wide angle end, the term "lens component" referring to a lens member is a single lens element or a cemented lens component delimited by effective lens surfaces that are in contact with air, the Abbe constant being defined as $(n_{d1}-1)/(n_{F1}-n_{C1})$ with $n_{d1}$, $n_{C1}$, and $n_{F1}$ being the refractive indices of the first or second positive lens element with respect to the d-line, the C-line, and the F-line respectively.

3. The image pickup apparatus according to claim 2, wherein the third lens unit has a positive refracting power, the fourth lens unit has a positive refracting power, the fifth lens unit has a positive refracting power, and the total number of lens units in the zoom lens is five.

4. The image pickup apparatus according to claim 1, wherein the rear lens unit group comprises at least three lens units each having a positive refracting power.

5. The image pickup apparatus according to claim 4, wherein the third lens unit has a positive refracting power, the fourth lens unit has a positive refracting power, the fifth lens unit has a positive refracting power, and the total number of lens units in the zoom lens is five.

6. The image pickup apparatus according to claim 1, wherein the following conditional expression (4) is satisfied:

$$2.35 < |\Delta_{2G}/f_W| < 15 \quad (4),$$

where $\Delta_{2G}$ is the displacement of the position of the second lens unit at the telephoto end from the position of the second lens unit at the wide angle end with a displacement toward the image side being represented by a positive value, and $f_w$ is the focal length of the zoom lens at the wide angle end.

7. The image pickup apparatus according to claim 1, wherein the third lens unit has a positive refracting power, a fourth lens unit has a positive refracting power, the fifth lens unit has a negative refracting power, and the zoom lens comprises a sixth lens unit having a positive refracting power provided on the image side of the fifth lens unit.

8. The image pickup apparatus according to claim 1, wherein one of the first positive lens element and the second positive lens element satisfies the following conditional expression (5A) and the other of them satisfies the following conditional expression (5B):

$$\nu_{dpone} > 60 \tag{5A}$$

and $$\nu_{dpoth} < 60 \tag{5B}$$

where $\nu_{dpone}$ is the Abbe constant of one of the first and second positive lens elements with respect to the d-line, and $\nu_{dpoth}$ is the Abbe constant of the other of the first and second positive lens elements with respect to the d-line.

9. The image pickup apparatus according to claim 8, wherein the difference between the refractive index of the first positive lens element and the refractive index of the second positive lens element satisfies the following conditional expression (A):

$$0.1 < n_{dp1} - n_{dp2} < 0.65 \tag{A}$$

where $n_{dp1}$ is the refractive index with respect to the d-line of one of the first and second positive lens elements that has an Abbe constant smaller than that of the other, and $n_{dp2}$ is the refractive index with respect to the d-line of the other of the first and second positive lens elements.

10. The image pickup apparatus according to claim 1, wherein the third lens unit and the fourth lens unit each have a positive refracting power, the aperture stop and the third lens unit are kept stationary during zooming from the wide angle end to the telephoto end, and the fourth lens unit moves along the optical axis during zooming from the wide angle end to the telephoto end.

11. The image pickup apparatus according to claim 10, wherein the fifth lens unit has a positive refracting power, and the fifth lens unit is kept stationary during zooming from the wide angle end to the telephoto end.

12. The image pickup apparatus according to claim 10, wherein the fifth lens unit has a negative refracting power, the zoom lens comprises a sixth lens unit having a positive refracting power provided on the image side of the fifth lens unit, the distance between the fifth lens unit and the sixth lens unit changes during zooming from the wide angle end to the telephoto end, and the fifth lens unit moves during focusing.

13. The image pickup apparatus according to claim 10, wherein the fourth lens unit satisfies the following conditional expression (6):

$$0.1 < f_{4G}/f_T < 0.6 \tag{6}$$

where $f_{4G}$ is the focal length of the fourth lens unit, and $f_T$ is the focal length of the entire zoom lens system at the telephoto end.

14. The image pickup apparatus according to claim 10, wherein the lens unit located closest to the image side among the lens units in the zoom lens satisfies the following conditional expression (7):

$$0.1 < f_{RG}/f_T < 0.8 \tag{7}$$

where $f_{RG}$ is the focal length of the lens unit located closest to the image side among the lens units in the zoom lens, and $f_T$ is the focal length of the entire zoom lens system at the telephoto end.

15. An image pickup apparatus comprising:
a zoom lens; and
an image pickup element having an image pickup surface for converting an image formed by the zoom lens into an electrical signal, wherein
the zoom lens comprises, in order from the object side to the image side, a first lens unit having a positive refracting power comprising a reflecting member having a reflecting surface that deflects the optical path, a second lens unit having a negative refracting power, and a rear lens unit group having a positive refracting power as a whole and comprising, in order from the object side, a third lens unit, a fourth lens unit, and a fifth lens unit,
the zoom lens comprises an aperture stop disposed between the second lens unit and the fourth lens unit,
during zooming from the wide angle end to the telephoto end, the first lens unit is kept stationary, the second lens unit moves in such a way that it is located closer to the image side at the telephoto end than at the wide angle end, and the distances between the lens units change,
the first lens unit comprises, in order from the object side to the image side, a negative lens component, the reflecting member, and a rear sub-lens unit comprising a first positive lens element and a second positive lens element,
the second lens unit comprises a plurality of lens elements including a negative lens element, and
the following conditional expressions (1), (2), and (AA) are satisfied:

$$7 < f_T/f_W < 30 \tag{1}$$

$$0.5 < f_W/IH < 1.38 \tag{2}$$

and $$-0.2 < f_{2G}/f_T < -0.05 \tag{AA}$$

where $f_T$ is the focal length of the entire zoom lens system at the telephoto end, $f_W$ is the focal length of the entire zoom lens system at the wide angle end, IH is the highest image height in an effective image pickup area on the image pickup surface, $f_{2G}$ is the focal length of the second lens unit, and the term "lens component" refers to a lens member composed of a single lens element or a cemented lens component delimited by effective lens surfaces that are in contact with air.

16. An image pickup apparatus comprising:
a zoom lens; and
an image pickup element having an image pickup surface for converting an image formed by the zoom lens into an electrical signal, wherein
the zoom lens comprises, in order from the object side to the image side, a first lens unit having a positive refracting power comprising a reflecting member having a reflecting surface that deflects the optical path, a second lens unit having a negative refracting power, and a rear lens unit group having a positive refracting power as a whole and comprising, in order from the object side, a third lens unit, a fourth lens unit, and a fifth lens unit,
the zoom lens comprises an aperture stop disposed between the second lens unit and the fourth lens unit,
during zooming from the wide angle end to the telephoto end, the first lens unit is kept stationary, the second lens unit moves in such a way that it is located closer to the image side at the telephoto end than at the wide angle end, and the distances between the lens units change,
the first lens unit comprises, in order from the object side to the image side, a negative lens component, the reflecting member, and a rear sub-lens unit comprising a first positive lens element and a second positive lens element, the second lens unit comprises a plurality of lens elements including a negative lens element, the rear lens unit group comprises at least three lens units each having a positive refracting power, and the following conditional expressions (3), (4A), and (AA) are satisfied:

$$-0.2 < f_{2G}/f_T < -0.05 \quad (AA),$$

$$1.8 < \Delta_{2G}/f_W < 15 \quad (4A),$$

and $$16.5 < |\nu_{dp1} - \nu_{dp2}| < 80 \quad (3),$$

where $f_T$ is the focal length of the entire zoom lens system at the telephoto end, $f_w$ is the focal length of the entire zoom lens system at the wide angle end, $f_{2G}$ is the focal length of the second lens unit, $\Delta_{2G}$ is the displacement of the position of the second lens unit at the telephoto end from the position of the second lens unit at the wide angle end with a displacement toward the image side being represented by a positive value, $\nu_{dp1}$ is the Abbe constant of the first positive lens element in the first lens unit with respect to the d-line, $\nu_{dp2}$ is the Abbe constant of the second positive lens element in the first lens unit with respect to the d-line, the term "lens component" refers to a lens member composed of a single lens element or a cemented lens component delimited by effective lens surfaces that are in contact with air, and the Abbe constant is defined as $(n_{d1}-1)/(n_{F1}-n_{C1})$ with $n_{d1}$, $n_{C1}$, and $n_{F1}$ being the refractive indices of the first or second positive lens element with respect to the d-line, the C-line, and the F-line respectively.

17. The image pickup apparatus according to claim 16, wherein the third lens unit has a positive refracting power, the fourth lens unit has a positive refracting power, the fifth lens unit has a positive refracting power, and the total number of lens units in the zoom lens is five.

18. The image pickup apparatus according to claim 15, wherein the rear lens unit group comprises at least three lens units each having a positive refracting power.

19. The image pickup apparatus according to claim 18, wherein the third lens unit has a positive refracting power, the fourth lens unit has a positive refracting power, and the fifth lens unit has a positive refracting power.

20. The image pickup apparatus according to claim 15, wherein the following conditional expression (4A) is satisfied:

$$1.8 < \Delta_{2G}/f_w < 15 \quad (4A),$$

where $f_w$ is the focal length of the entire zoom lens system at the wide angle end, $\Delta_{2G}$ is the displacement of the position of the second lens unit at the telephoto end from the position of the second lens unit at the wide angle end with a displacement toward the image side being represented by a positive value.

21. The image pickup apparatus according to claim 15, wherein the following conditional expression (3) is satisfied:

$$16.5 < |\nu_{dp1} - \nu_{dp2}| < 80 \quad (3),$$

where $\nu_{dp1}$ is the Abbe constant of the first positive lens element in the first lens unit with respect to the d-line, $\nu_{dp2}$ is the Abbe constant of the second positive lens element in the first lens unit with respect to the d-line, and the Abbe constant is defined as $(n_{d1}-1)/(n_{F1}-n_{C1})$ with $n_{d1}$, $n_{C1}$, and $n_{F1}$ being the refractive indices of the first or second positive lens element with respect to the d-line, the C-line, and the F-line respectively.

22. The image pickup apparatus according to claim 15, wherein the lens element located closest to the object side in the second lens unit satisfies the following conditional expression (B):

$$N_{dn1} \geq 1.60 \quad (B),$$

where $N_{dn1}$ is the refractive index with respect to the d-line of the negative lens element located closest to the object side among the lens elements in the second lens unit.

23. The image pickup apparatus according to claim 15, wherein the second lens unit comprises a first negative lens element in the form of a single lens element, and a cemented lens component made up of a second negative lens element and a positive lens element, the image side surface of the first negative lens element and the image side surface of the second negative lens element are both concave surfaces, and the following conditional expression (C) is satisfied:

$$2.0 < SF_{2G} < 30.0 \quad (C),$$

where $SF_{2G}$ is defined by the equation $SF_{2G} = |(R_1+R_2)/(R_1-R_2)|$, $R_1$ is the paraxial radius of curvature of the image side surface of the first negative lens element, and $R_2$ is the paraxial radius of curvature of the image side surface of the second negative lens element in the cemented lens component.

24. The image pickup apparatus according to claim 15, wherein the negative lens element located closest to the object side in the second lens unit has an aspheric lens surface.

25. The image pickup apparatus according to claim 15, wherein the following conditional expression (D) is satisfied:

$$1.0 < L_T/f_T < 2.0 \quad (D),$$

where $L_T$ is the sum of the back focus and the distance from the entrance surface of the zoom lens to an exit lens surface of the zoom lens at the telephoto end, and the back focus is calculated as the equivalent air distance.

26. The image pickup apparatus according to claim 15, wherein the second lens unit satisfies the following conditional expression (E):

$$0.05 < \Delta_{2G}/f_T < 0.4 \quad (E),$$

where $\Delta_{2G}$ is the displacement of the position of the second lens unit at the telephoto end from the position of the second lens unit at the wide angle end with a displacement toward the image side being represented by a positive value.

27. The image pickup apparatus according to claim 15, wherein the second lens unit satisfies the following conditional expression (F):

$$0.5 < \Sigma_{2G}/f_W < 1.0 \quad (F),$$

where $\Sigma_{2G}$ is the thickness of the second lens unit on the optical axis, and $f_W$ is the focal length of the entire zoom lens system at the wide angle end.

28. The image pickup apparatus according to claim 15, wherein the aperture stop is kept stationary during zooming from the wide angle end to the telephoto end.

29. The image pickup apparatus according to claim 15, wherein the third lens unit has a positive refracting power, and the third lens unit and the aperture stop are kept stationary during zooming from the wide angle end to the telephoto end.

30. The image pickup apparatus according to claim 15, wherein the third lens unit has a positive refracting power, the fourth lens unit has a positive refracting power, the fifth lens unit has a negative refracting power, and the zoom lens comprises a sixth lens unit having a positive refracting power provided on the image side of the fifth lens unit.

31. The image pickup apparatus according to claim 15, wherein one of the first positive lens element and the second positive lens element satisfies the following conditional expression (5A) and the other of them satisfies the following conditional expression (5B):

$$\nu_{dpone} > 60 \quad (5A),$$

and $$\nu_{dpoth} < 60 \quad (5B)$$

where $\nu_{dpone}$ is the Abbe constant of one of the first and second positive lens elements with respect to the d-line, and $\nu_{dpoth}$ is the Abbe constant of the other of the first and second positive lens elements with respect to the d-line.

32. The image pickup apparatus according to claim 31, wherein the difference between the refractive index of the first positive lens element and the refractive index of the second positive lens element satisfies the following conditional expression (A):

$$0.1 < n_{dp1} - n_{dp2} < 0.65 \quad (A),$$

where $n_{dp1}$ is the refractive index with respect to the d-line of one of the first and second positive lens elements that has an Abbe constant smaller than that of the other, and $n_{dp2}$ is the refractive index with respect to the d-line of the other of the first and second positive lens elements.

33. The image pickup apparatus according to claim 31, wherein the third lens unit and the fourth lens unit each have a positive refracting power, the aperture stop and the third lens unit are kept stationary during zooming from the wide angle end to the telephoto end, and the fourth lens unit is moved along the optical axis during zooming from the wide angle end to the telephoto end.

34. The image pickup apparatus according to claim 33, wherein the fifth lens unit has a positive refracting power, and the fifth lens unit is kept stationary during zooming from the wide angle end to the telephoto end.

35. The image pickup apparatus according to claim 33, wherein the fifth lens unit has a negative refracting power, the zoom lens comprises a sixth lens unit having a positive refracting power provided on the image side of the fifth lens unit, the distance between the fifth lens unit and the sixth lens unit changes during zooming from the wide angle end to the telephoto end, and the fifth lens unit moves during focusing.

36. The image pickup apparatus according to claim 33, wherein the fourth lens unit satisfies the following conditional expression (6):

$$0.1 < f_{4G}/f_T < 0.6 \quad (6),$$

where $f_{4G}$ is the focal length of the fourth lens unit, and $f_T$ is the focal length of the entire zoom lens system at the telephoto end.

37. The image pickup apparatus according to claim 33, wherein the lens unit located closest to the image side among the lens units in the zoom lens satisfies the following conditional expression (7):

$$0.1 < f_{RG}/f_T < 0.8 \quad (7),$$

where $f_{RG}$ is the focal length of the lens unit located closest to the image side among the lens units in the zoom lens, and $f_T$ is the focal length of the entire zoom lens system at the telephoto end.

38. The image pickup apparatus according to claim 15 comprising an image transforming section that transforms, by image processing, an electrical signal representing an image having distortion attributed to the zoom lens output from the image pickup element into an image signal representing an image that is corrected in terms of distortion.

* * * * *